(12) United States Patent
Porzio et al.

(10) Patent No.: US 11,921,627 B2
(45) Date of Patent: Mar. 5, 2024

(54) USAGE LEVEL IDENTIFICATION FOR MEMORY DEVICE ADDRESSES

(71) Applicant: Micron Technology, Inc., Boise, ID (US)

(72) Inventors: Luca Porzio, Casalnuovo (IT); Roberto Izzi, Caserta (IT); Giuseppe Cariello, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 3 days.

(21) Appl. No.: 17/241,877

(22) Filed: Apr. 27, 2021

(65) Prior Publication Data

US 2022/0342808 A1 Oct. 27, 2022

(51) Int. Cl.
| | |
|---|---|
| *G06F 12/02* | (2006.01) |
| *G06F 3/06* | (2006.01) |
| *G06F 12/126* | (2016.01) |
| *G06F 13/16* | (2006.01) |

(52) U.S. Cl.
CPC .......... *G06F 12/0246* (2013.01); *G06F 3/061* (2013.01); *G06F 3/0611* (2013.01); *G06F 3/0613* (2013.01); *G06F 3/0635* (2013.01); *G06F 3/0679* (2013.01); *G06F 12/126* (2013.01); *G06F 13/1668* (2013.01); *G06F 2212/7201* (2013.01); *G06F 2212/7207* (2013.01)

(58) Field of Classification Search
CPC .............. G06F 12/0246; G06F 3/0679; G06F 2212/7201; G06F 2212/7202; G06F 2212/7207; G06F 3/061; G06F 3/0611; G06F 3/0613; G06F 3/0635; G06F 12/0238; G06F 12/023; G06F 12/0292; G06F 2212/7204
See application file for complete search history.

(56) References Cited

U.S. PATENT DOCUMENTS

| | | | |
|---|---|---|---|
| 10,379,784 B1 * | 8/2019 | Sethuraman | G06F 12/0246 |
| 11,061,828 B1 * | 7/2021 | Peterson | G06F 12/0875 |

(Continued)

OTHER PUBLICATIONS

Log-structured file systems: There's one in every SSD by Aurora (Year: 2009).*

(Continued)

*Primary Examiner* — Paul M Knight
(74) *Attorney, Agent, or Firm* — Holland & Hart LLP

(57) ABSTRACT

Methods, systems, and devices for usage level identification for memory device addresses are described. Systems, techniques, and devices are described herein in which a memory device may determine where to store data according to a level of usage of the data. The memory device may receive a write command indicating data to be written, a type of the data, and a logical address of a memory array for writing the data. The memory device may identify an entry associated with the logical address in a table that maps the logical address to a physical address of the memory array. The entry may include a field configured to maintain a level of usage for the logical address. The memory device may update the level of usage value according to a process and write the data to a physical address of the memory array based on the level of usage value.

25 Claims, 7 Drawing Sheets

(56) References Cited

U.S. PATENT DOCUMENTS

| | | | | |
|---|---|---|---|---|
| 2015/0019794 A1* | 1/2015 | Byun | ................. | G06F 12/0246 |
| | | | | 711/103 |
| 2020/0110544 A1* | 4/2020 | Zhu | ........................ | G06F 12/10 |
| 2021/0073078 A1* | 3/2021 | Cho | .................... | G06F 12/0882 |
| 2021/0240618 A1* | 8/2021 | Gupta | .................... | G06F 3/061 |

OTHER PUBLICATIONS

Operating Systems Three Easy Pieces; Log Structured File Systems by Arpaci (Year: 2019).*
The End of Block Barriers by Corbet (Year: 2010).*
SQL Server On Linux Fua Internals by Microsoft (Year: 2010).*
Linux Kernel Organization, Inc., "The Linux Kernel Archives," website, https://www.kernel.org/doc/html/latest/filesystems/ext4/index.html, last retrieved on Apr. 27, 2021.
Linux Kernel Organization, Inc., "The Linux Kernel Archives," website, https://www.kernel.org, last retrieved on Apr. 27, 2021.

* cited by examiner

USAGE LEVEL IDENTIFICATION FOR MEMORY DEVICE ADDRESSES

FIELD OF TECHNOLOGY

The following relates generally to one or more systems for memory and more specifically to usage level identification for memory device addresses.

BACKGROUND

Memory devices are widely used to store information in various electronic devices such as computers, wireless communication devices, cameras, digital displays, and the like. Information is stored by programing memory cells within a memory device to various states. For example, binary memory cells may be programmed to one of two supported states, often corresponding to a logic 1 or a logic 0. In some examples, a single memory cell may support more than two possible states, any one of which may be stored by the memory cell. To access information stored by a memory device, a component may read, or sense, the state of one or more memory cells within the memory device. To store information, a component may write, or program, one or more memory cells within the memory device to corresponding states.

Various types of memory devices exist, including magnetic hard disks, random access memory (RAM), read-only memory (ROM), dynamic RAM (DRAM), synchronous dynamic RAM (SDRAM), static RAM (SRAM), ferroelectric RAM (FeRAM), magnetic RAM (MRAM), resistive RAM (RRAM), flash memory, phase change memory (PCM), 3-dimensional cross-point memory (3D cross point), not-or (NOR) and not-and (NAND) memory devices, and others. Memory devices may be volatile or non-volatile. Volatile memory cells (e.g., DRAM cells) may lose their programmed states over time unless they are periodically refreshed by an external power source. Non-volatile memory cells (e.g., NAND memory cells) may maintain their programmed states for extended periods of time even in the absence of an external power source.

DETAILED DESCRIPTION

Figure 1:
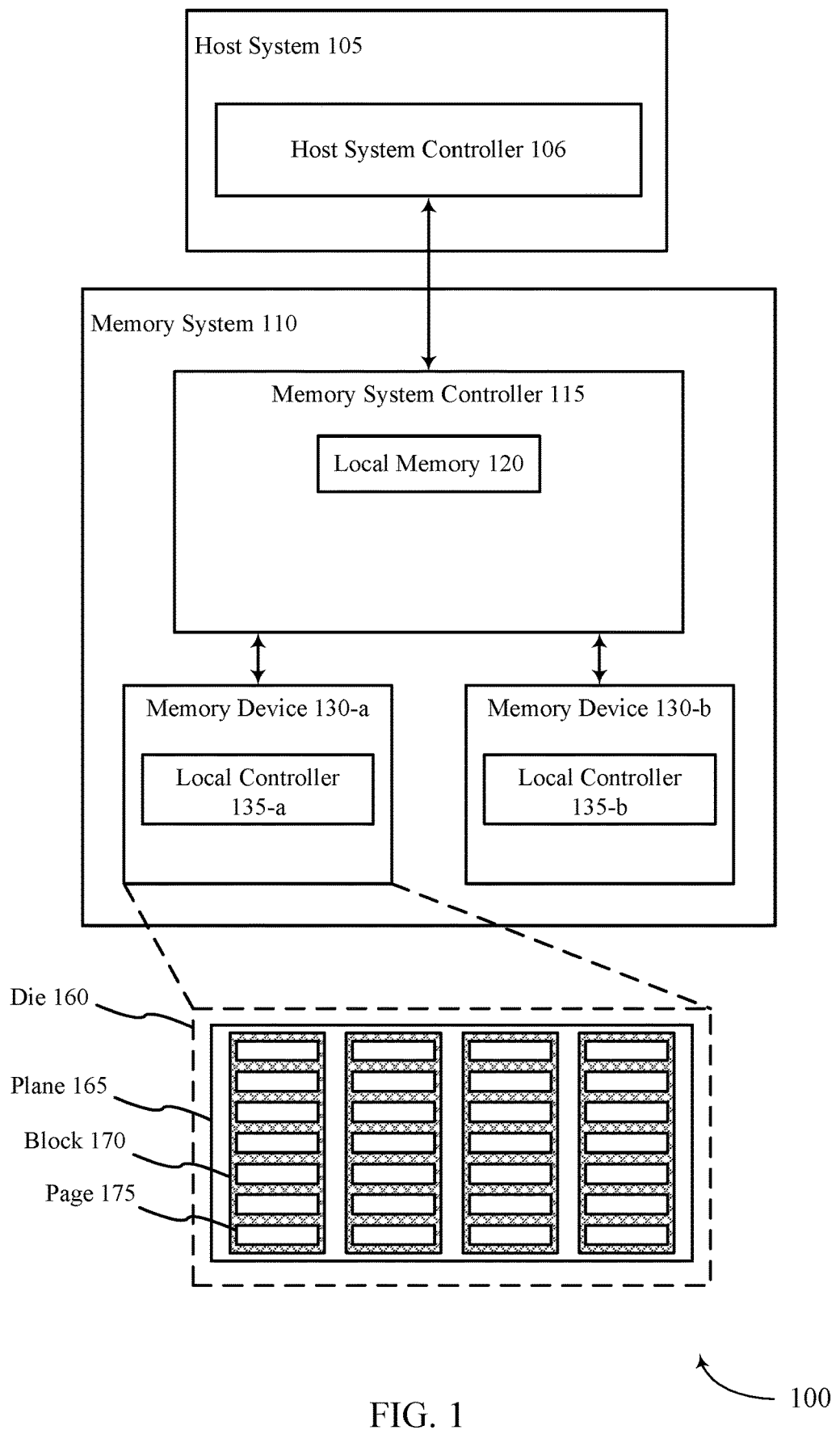
FIG. 1 illustrates an example of a system that supports usage level identification for memory device addresses in accordance with examples as disclosed herein.

A memory system may include subsets of memory cells (e.g., in an array) for storing data or other information. Some subsets of a memory array may support relatively higher performance storage and access operations than other portions. For example, the relatively higher performance memory portions may be associated with higher reliability, faster access operations, smaller data size, and the like, than relatively lower performance memory portions. In one example, a memory array may include one or more single level cell (SLC) subsets and one or more multi-level cell (MLC) subsets (e.g., dual-level cells, triple-level cells (TLC), quad-level cells (QLC), or penta-level cells (PLC)), where the SLC subsets may support higher performance storage and access operations than the MLC subsets.

In some cases, a memory device (e.g., not-and (NAND) memory devices, or other types of memory devices) may determine where to store data within a memory array based on or in response to a size of the data of the data to be stored. For example, the memory device may determine to write data having a relatively larger size to lower performance memory (e.g., TLC, MLC) and data having a relatively smaller size to higher performance memory (e.g., SLC). The memory device may map a logical address (e.g., a logical block address (LBA)) associated with the data to a physical address (e.g., a physical block address (PBA)) within the memory array, where the physical address (e.g., the subset of the memory array) may be based on or in response to the size of data. However, some logical addresses of the memory device with a higher usage level (e.g., that may be more frequently overwritten) may be written to a lower performance memory (e.g., based on or in response to the data size). Similarly, some logical addresses that have a lower usage level (e.g., that may not be as frequently overwritten) may be written to higher performance memory (e.g., based on or in response to the data size). In such cases, writing relatively more frequently to the lower performance memory and relatively less frequently to the higher performance memory may impact performance of the memory device.

As described herein, a memory device may identify a level of usage of a logical address, among other aspects, and write the data associated with the logical address to higher performance memory or lower performance memory based on or in response to the identified level of usage. A logical-to-physical (L2P) mapping table (e.g., to map the logical address to a physical address) may be configured with a field for storing a value indicative of the level of usage. The memory device may determine the level of usage and update the field based on or in response to a type of the data (e.g., some types of data may be associated with a higher frequency of overwriting), based on or in response to whether the logical address is mapped or unmapped, based on or in response to a quantity of times the logical address has been remapped, or based on or in response to whether the logical address is associated with an open data log (e.g., or a combination thereof), among other examples. The memory device may write the data to a type of memory (e.g., higher performance or lower performance memory) based on or in response to the level of usage indicated by the field within the L2P table. For example, the memory device may determine whether to write the data to higher performance memory in response to determining whether the value indicative of the level of usage exceeds a threshold.

Features of the disclosure are initially described in the context of systems with reference to FIG. 1. Features of the disclosure are described in the context of a L2P table, flow diagrams, and a data log table, with reference to FIGS. 2-5. These and other features of the disclosure are further illustrated by and described in the context of an apparatus diagram and flowchart that relate to usage level identification for memory device addresses with reference to FIGS. 6-7.

FIG. 1 illustrates an example of a system 100 that supports usage level identification for memory device addresses in accordance with examples as disclosed herein. The system 100 includes a host system 105 coupled with a memory system 110.

A memory system 110 may be or include any device or collection of devices, where the device or collection of devices includes at least one memory array. For example, a memory system 110 may be or include a Universal Flash Storage (UFS) device, an embedded Multi-Media Controller (eMMC) device, a flash device, a universal serial bus (USB) flash device, a secure digital (SD) card, a solid-state drive (SSD), a hard disk drive (HDD), a dual in-line memory module (DIMM), a small outline DIMM (SO-DIMM), or a non-volatile DIMM (NVDIMM), among other possibilities.

The system 100 may be included in a computing device such as a desktop computer, a laptop computer, a network server, a mobile device, a vehicle (e.g., airplane, drone, train, automobile, or other conveyance), an Internet of Things (IoT) enabled device, an embedded computer (e.g., one included in a vehicle, industrial equipment, or a networked commercial device), or any other computing device that includes memory and a processing device.

The system 100 may include a host system 105, which may be coupled with the memory system 110. In some examples, this coupling may include an interface with a host system controller 106, which may be an example of a controller or control component configured to cause the host system 105 to perform various operations in accordance with examples as described herein. The host system 105 may include one or more devices, and in some cases may include a processor chipset and a software stack executed by the processor chipset. For example, the host system 105 may include an application configured for communicating with the memory system 110 or a device therein. The processor chipset may include one or more cores, one or more caches (e.g., memory local to or included in the host system 105), a memory controller (e.g., NVDIMM controller), and a storage protocol controller (e.g., peripheral component interconnect express (PCIe) controller, serial advanced technology attachment (SATA) controller). The host system 105 may use the memory system 110, for example, to write data to the memory system 110 and read data from the memory system 110. Although one memory system 110 is shown in FIG. 1, the host system 105 may be coupled with any quantity of memory systems 110.

The host system 105 may be coupled with the memory system 110 via at least one physical host interface. The host system 105 and the memory system 110 may in some cases be configured to communicate via a physical host interface using an associated protocol (e.g., to exchange or otherwise communicate control, address, data, and other signals between the memory system 110 and the host system 105). Examples of a physical host interface may include, but are not limited to, a SATA interface, a UFS interface, an eMMC interface, a PCIe interface, a USB interface, a Fiber Channel interface, a Small Computer System Interface (SCSI), a Serial Attached SCSI (SAS), a Double Data Rate (DDR) interface, a DIMM interface (e.g., DIMM socket interface that supports DDR), an Open NAND Flash Interface (ONFI), and a Low Power Double Data Rate (LPDDR) interface. In some examples, one or more such interfaces may be included in or otherwise supported between a host system controller 106 of the host system 105 and a memory system controller 115 of the memory system 110. In some examples, the host system 105 may be coupled with the memory system 110 (e.g., the host system controller 106 may be coupled with the memory system controller 115) via a respective physical host interface for each memory device 130 included in the memory system 110, or via a respective physical host interface for each type of memory device 130 included in the memory system 110.

The memory system 110 may include a memory system controller 115 and one or more memory devices 130. A memory device 130 may include one or more memory arrays of any type of memory cells (e.g., non-volatile memory cells, volatile memory cells, or any combination thereof). Although two memory devices 130-a and 130-b are shown in the example of FIG. 1, the memory system 110 may include any quantity of memory devices 130. Further, if the memory system 110 includes more than one memory device 130, different memory devices 130 within the memory system 110 may include the same or different types of memory cells.

The memory system controller 115 may be coupled with and communicate with the host system 105 (e.g., via the physical host interface) and may be an example of a controller or control component configured to cause the memory system 110 to perform various operations in accordance with examples as described herein. The memory system controller 115 may also be coupled with and communicate with memory devices 130 to perform operations such as reading data, writing data, erasing data, or refreshing data at a memory device 130—among other such operations—which may generically be referred to as access operations. In some cases, the memory system controller 115 may receive commands from the host system 105 and communicate with one or more memory devices 130 to execute such commands (e.g., at memory arrays within the one or more memory devices 130). For example, the memory system controller 115 may receive commands or operations from the host system 105 and may convert the commands or operations into instructions or appropriate commands to achieve the desired access of the memory devices 130. In some cases, the memory system controller 115 may exchange data with the host system 105 and with one or more memory devices 130 (e.g., in response to or otherwise in association with commands from the host system 105). For example, the memory system controller 115 may convert responses (e.g., data packets or other signals) associated with the memory devices 130 into corresponding signals for the host system 105.

The memory system controller 115 may be configured for other operations associated with the memory devices 130. For example, the memory system controller 115 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., LBAs) associated with commands from the host system 105 and physical addresses (e.g., PBAs) associated with memory cells within the memory devices 130.

The memory system controller 115 may include hardware such as one or more integrated circuits or discrete components, a buffer memory, or a combination thereof. The hardware may include circuitry with dedicated (e.g., hardcoded) logic to perform the operations ascribed herein to the memory system controller 115. The memory system controller 115 may be or include a microcontroller, special purpose logic circuitry (e.g., a field programmable gate array (FPGA), an application specific integrated circuit (ASIC), a digital signal processor (DSP)), or any other suitable processor or processing circuitry.

The memory system controller 115 may also include a local memory 120. In some cases, the local memory 120 may include read-only memory (ROM) or other memory that may store operating code (e.g., executable instructions) executable by the memory system controller 115 to perform functions ascribed herein to the memory system controller 115. In some cases, the local memory 120 may additionally or alternatively include static random access memory (SRAM) or other memory that may be used by the memory system controller 115 for internal storage or calculations, for example, related to the functions ascribed herein to the memory system controller 115. Additionally or alternatively, the local memory 120 may serve as a cache for the memory system controller 115. For example, data may be stored in the local memory 120 if read from or written to a memory device 130, and the data may be available within the local memory 120 for subsequent retrieval for or manipulation (e.g., updating) by the host system 105 (e.g., with reduced latency relative to a memory device 130) in accordance with a cache policy.

Although the example of the memory system 110 in FIG. 1 has been illustrated as including the memory system controller 115, in some cases, a memory system 110 may not include a memory system controller 115. For example, the memory system 110 may additionally or alternatively rely upon an external controller (e.g., implemented by the host system 105) or one or more local controllers 135, which may be internal to memory devices 130, respectively, to perform the functions ascribed herein to the memory system controller 115. In general, one or more functions ascribed herein to the memory system controller 115 may in some cases instead be performed by the host system 105, a local controller 135, or any combination thereof. In some cases, a memory device 130 that is managed at least in part by a memory system controller 115 may be referred to as a managed memory device. An example of a managed memory device is a managed NAND (MNAND) device.

A memory device 130 may include one or more arrays of non-volatile memory cells. For example, a memory device 130 may include NAND (e.g., NAND flash) memory, ROM, phase change memory (PCM), self-selecting memory, other chalcogenide-based memories, ferroelectric random access memory (RAM) (FeRAM), magneto RAM (MRAM), NOR (e.g., NOR flash) memory, Spin Transfer Torque (STT)-MRAM, conductive bridging RAM (CBRAM), resistive random access memory (RRAM), oxide based RRAM (OxRAM), electrically erasable programmable ROM (EEPROM), or any combination thereof. Additionally or alternatively, a memory device 130 may include one or more arrays of volatile memory cells. For example, a memory device 130 may include RAM memory cells, such as dynamic RAM (DRAM) memory cells and synchronous DRAM (SDRAM) memory cells.

In some examples, a memory device 130 may include (e.g., on a same die or within a same package) a local controller 135, which may execute operations on one or more memory cells of the respective memory device 130. A local controller 135 may operate in conjunction with a memory system controller 115 or may perform one or more functions ascribed herein to the memory system controller 115. For example, as illustrated in FIG. 1, a memory device 130-a may include a local controller 135-a and a memory device 130-b may include a local controller 135-b.

In some cases, a memory device 130 may be or include a NAND device (e.g., NAND flash device). A memory device 130 may be or include a memory die 160. For example, in some cases, a memory device 130 may be a package that includes one or more dies 160. A die 160 may, in some examples, be a piece of electronics-grade semiconductor cut from a wafer (e.g., a silicon die cut from a silicon wafer). Each die 160 may include one or more planes 165, and each plane 165 may include a respective set of blocks 170, where each block 170 may include a respective set of pages 175, and each page 175 may include a set of memory cells.

In some cases, a NAND memory device 130 may include memory cells configured to each store one bit of information, which may be referred to as SLCs. Additionally or alternatively, a NAND memory device 130 may include memory cells configured to each store multiple bits of information, which may be referred to as MLCs if configured to each store two bits of information, as TLCs if configured to each store three bits of information, as QLCs if configured to each store four bits of information, or more generically as multiple-level memory cells. Multiple-level memory cells may provide greater density of storage relative to SLC memory cells but may, in some cases, involve narrower read or write margins or greater complexities for supporting circuitry.

In some cases, planes 165 may refer to groups of blocks 170, and in some cases, concurrent operations may take place within different planes 165. For example, concurrent operations may be performed on memory cells within different blocks 170 so long as the different blocks 170 are in different planes 165. In some cases, performing concurrent operations in different planes 165 may be subject to one or more restrictions, such as identical operations being performed on memory cells within different pages 175 that have the same page address within their respective planes 165 (e.g., related to command decoding, page address decoding circuitry, or other circuitry being shared across planes 165).

In some cases, a block 170 may include memory cells organized into rows (pages 175) and columns (e.g., strings, not shown). For example, memory cells in a same page 175 may share (e.g., be coupled with) a common word line, and memory cells in a same string may share (e.g., be coupled with) a common digit line (which may alternatively be referred to as a bit line).

For some NAND architectures, memory cells may be read and programmed (e.g., written) at a first level of granularity (e.g., at the page level of granularity) but may be erased at a second level of granularity (e.g., at the block level of granularity). That is, a page 175 may be the smallest unit of memory (e.g., set of memory cells) that may be independently programmed or read (e.g., programed or read concurrently as part of a single program or read operation), and a block 170 may be the smallest unit of memory (e.g., set of memory cells) that may be independently erased (e.g., erased concurrently as part of a single erase operation). Further, in some cases, NAND memory cells may be erased before they can be re-written with new data. Thus, for example, a used page 175 may in some cases not be updated until the entire block 170 that includes the page 175 has been erased.

In some cases, to update some data within a block 170 while retaining other data within the block 170, the memory device 130 may copy the data to be retained to a new block 170 and write the updated data to one or more remaining pages of the new block 170. The memory device 130 (e.g., the local controller 135) or the memory system controller 115 may mark or otherwise designate the data that remains in the old block 170 as invalid or obsolete and may update a L2P mapping table to associate the logical address (e.g., LBA) for the data with the new, valid block 170 rather than the old, invalid block 170. In some cases, such copying and remapping may be instead of erasing and rewriting the entire old block 170 due to latency or wear out considerations, for example. In some cases, one or more copies of an L2P mapping table may be stored within the memory cells of the memory device 130 (e.g., within one or more blocks 170 or planes 165) for use (e.g., reference and updating) by the local controller 135 or memory system controller 115.

In some cases, L2P mapping tables may be maintained and data may be marked as valid or invalid at the page level of granularity, and a page 175 may contain valid data, invalid data, or no data. Invalid data may be data that is outdated due to a more recent or updated version of the data being stored in a different page 175 of the memory device 130. Invalid data may have been previously programmed to the invalid page 175 but may no longer be associated with a valid logical address, such as a logical address referenced by the host system 105. Valid data may be the most recent version of such data being stored on the memory device 130. A page 175 that includes no data may be a page 175 that has never been written to or that has been erased.

In some cases, a memory system controller 115 or a local controller 135 may perform operations (e.g., as part of one or more media management processes) for a memory device 130, such as wear leveling, background refresh, garbage collection, scrub, block scans, health monitoring, or others, or any combination thereof. For example, within a memory device 130, a block 170 may have some pages 175 containing valid data and some pages 175 containing invalid data. To avoid waiting for all of the pages 175 in the block 170 to have invalid data in order to erase and reuse the block 170, a process referred to as "garbage collection" may be invoked to allow the block 170 to be erased and released as a free block for subsequent write operations. Garbage collection may refer to a set of media management operations that include, for example, selecting a block 170 that contains valid and invalid data, selecting pages 175 in the block that contain valid data, copying the valid data from the selected pages 175 to new locations (e.g., free pages 175 in another block 170), marking the data in the previously selected pages 175 as invalid, and erasing the selected block 170. As a result, the quantity of blocks 170 that have been erased may be increased such that more blocks 170 are available to store subsequent data (e.g., data subsequently received from the host system 105).

To access information stored at a memory device 130, the host system 105 may communicate one or more access commands to the memory system 110. The host system 105 may use logical addresses (e.g., LBAs) for the access commands (e.g., to indicate a logical address associated with the information), while the memory system 110 may use physical addresses (e.g., PBAs) to execute the access commands (e.g., to read or write the information to a memory array). Each logical address and each physical address may be associated with a same granularity of data, such as 4 kB, and multiple physical addresses may be associated with one page 175. A physical address may refer to a location of a set of memory cells within a page 175 (e.g., may be different from an address of a block 170).

The memory system 110 may associate logical addresses and physical addresses to execute access commands from the host system 105. To perform address association, the memory system 110 may use one or more L2P tables, each of which may indicate a set of logical addresses and their corresponding physical addresses, as described herein and in greater detail with reference to FIG. 2. In some examples, the logical addresses in the L2P table(s) may be numerically sequential (e.g., each L2P table may provide the physical address mapping for a set of numerically sequential logical addresses).

The L2P table(s) used by the memory system 110 may be stored in one or more of the memory devices 130 (e.g., based on or in response to a size of the L2P table(s)). In some cases, to avoid accessing a memory device 130 each time the memory system 110 uses an L2P table for address association (e.g., translation between logical and physical addresses), the memory system 110 may move the L2P table from the memory device 130 to another location such as a cache memory, which may have a faster access time than the memory in the memory device 130.

As described herein, each L2P entry of a L2P table may include a field indicative of a level of usage of the corresponding logical address (e.g., a frequency of overwrites associated with the logical address). The field may be referred to as a level of usage field and may include a quantity of bits for storing a value indicative of the level of usage associated with the logical address. In some examples, the field may be referred to as a hot/cold field (e.g., an HC field, indicative of hot or cold logical addresses). For each write request received from the host system 105, the memory system 110 may determine whether to update the level of usage field for the indicated logical address or not. The level of usage of the logical address may be determined by a type of the data to be written, a mapping status of the logical address (e.g., as indicated via a mapping indication field in the L2P entry), a quantity of times the logical address has been remapped, whether the logical address is associated with an open data log (e.g., or any combination thereof), among other examples. The memory system 110 may determine to write the data to either higher performance memory (e.g., SLC) or lower performance memory (e.g., TLC, QLC, MLC) based on or in response to the value of the level of usage field for the corresponding logical address.

The system 100 may include any quantity of non-transitory computer readable media that may support usage level identification for memory device addresses. For example, the host system 105, the memory system controller 115, or a memory device 130 may include or otherwise may access one or more non-transitory computer readable media storing instructions (e.g., firmware) for performing the functions ascribed herein to the host system 105, memory system controller 115, or memory device 130. For example, such instructions, if executed by the host system 105 (e.g., by the host system controller 106), by the memory system controller 115, or by a memory device 130 (e.g., by a local controller 135), may cause the host system 105, memory system controller 115, or memory device 130 to perform one or more associated functions as described herein.

In some cases, a memory system 110 may utilize a memory system controller 115 to provide a managed memory system that may include, for example, one or more memory arrays and related circuitry combined with a local (e.g., on-die or in-package) controller (e.g., local controller 135). An example of a managed memory system is a managed NAND (MNAND) system.

Figure 2:
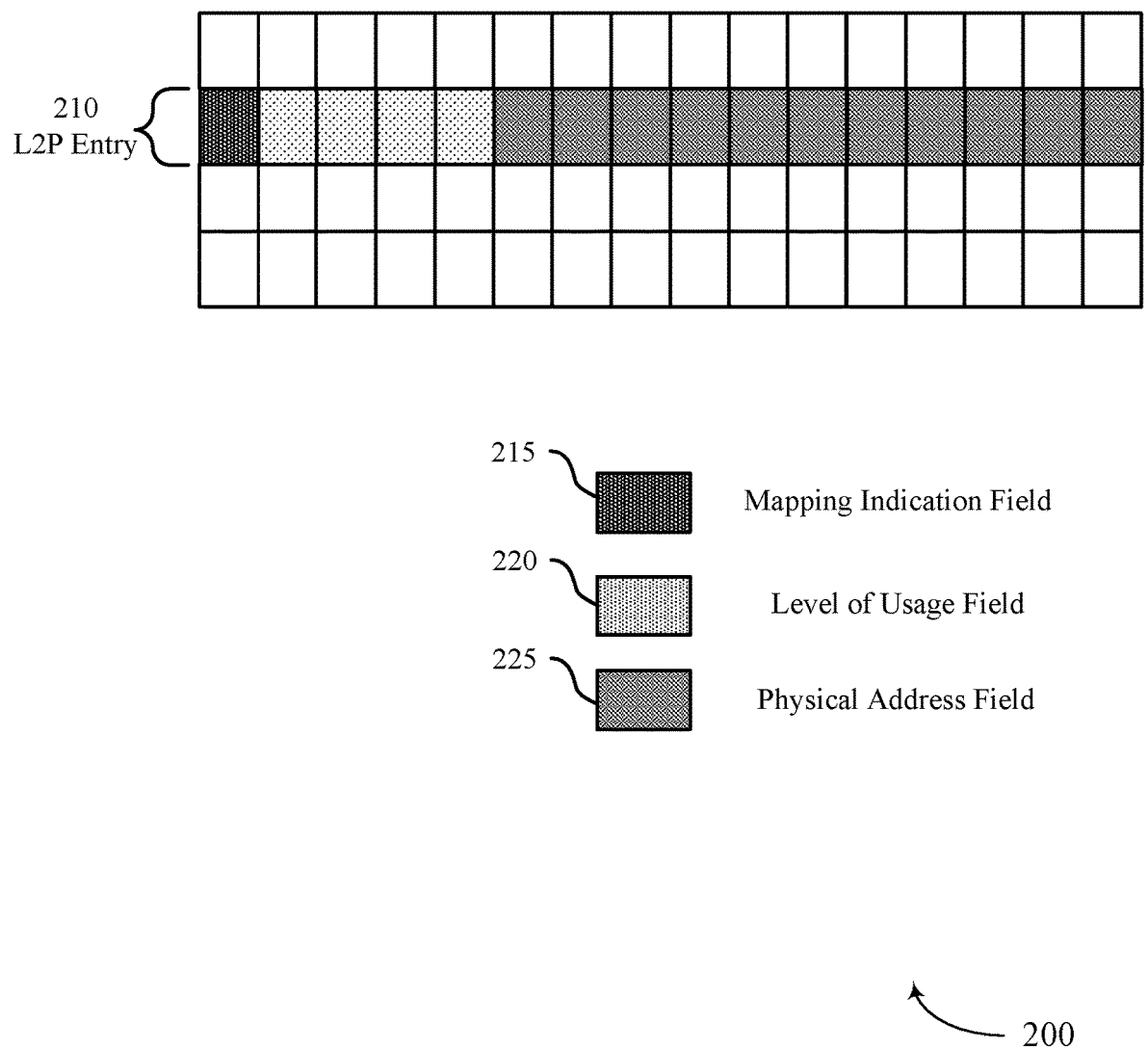
FIG. 2 illustrates an example of a logical-to-physical (L2P) table that supports usage level identification for memory device addresses in accordance with examples as disclosed herein.

FIG. 2 illustrates an example of a L2P table 200 that supports usage level identification for memory device addresses in accordance with examples as disclosed herein.

A memory device, such as a memory device 130 as described with reference to FIG. 1, may receive a write command indicating data to be written and a logical address of a memory array for writing the data. The memory device may translate the logical address to a physical address using a mapping provided by the L2P table 200, as generally described with reference to FIG. 1. The L2P table 200 may include a L2P entry 210 corresponding to the logical address of the memory array. The L2P table 200 may also include one or more other L2P entries 210 corresponding to other logical addresses of the memory array. In some examples, the L2P entries 210 may be associated with numerically sequential logical addresses.

In some cases, each L2P entry 210 may include at least a mapping indication field 215 and a physical address field 225. Each field may include a quantity of bits, as represented by each box within the field. The mapping indication field 215 may indicate whether the logical address is mapped (e.g., is associated with data stored at the memory array, is associated with a used physical address). The physical address field 225 may include a pointer to a physical address associated with the logical address. A quantity of bits within the physical address field 225 may correspond to a density of a memory array of the memory device (e.g., an amount of available storage within the memory device). The memory device may determine where to write data within a memory array based on or in response to the fields within the L2P entry 210 for a corresponding logical address and one or more other parameters associated with the logical address (e.g., a data block size).

A memory array may include portions of higher performance memory (e.g., SLC) and portions of lower performance memory (e.g., MLC or TLC). High performance memory, such as SLC memory, may be associated with higher reliability, faster read and write operations, smaller data sizes, and the like, as compared with lower performance memory, such as MLC or TLC memory. In some examples, higher performance memory may be available in smaller quantities within a memory array than lower performance memory (e.g., due to higher costs or complexity).

In some cases, if a memory device receives a write command indicating data to be written and a logical address associated with the data, the memory device may determine where to write the data (e.g., a mapping between the logical address and a physical address of the memory array) based on or in response to a size of the data to be written (e.g., write traffic). For example, if a write command indicates that a relatively large amount of data is to be written to the array, the memory device may determine to write the data to a lower performance portion of the memory array, such as TLC or MLC. If the write command indicates a relatively small amount of data is to be written to the array, the memory device may determine to write the data to a higher performance portion of the memory array, such as SLC.

Such techniques for mapping logical addresses to physical addresses based on or in response to a data size (e.g., a chunk size) may not account for a level of usage associated with the logical addresses (e.g., a frequency of overwrites associated with the write data). As such, in some cases, a logical address associated with data that is frequently accessed (e.g., frequently used by a customer platform) may be mapped to a lower performance portion of the memory array (e.g., based on or in response to the data size), which may increase latency and reduce reliability associated with accessing the data. Similarly, in some cases, a logical address associated with data that is not frequently accessed (e.g., less frequently used by a customer platform) may be mapped to a higher performance portion of the memory array (e.g., based on or in response to the data size), which may reduce an amount of storage within the higher performance portion for more frequently accessed data. Writing relatively more frequently to a lower performance portion of the memory array and relatively less frequently to a higher performance portion may reduce a performance level of the memory device.

Different types of data may be associated with different levels of usage (e.g., some types of data may be overwritten more frequently than other types of data). In some examples, data traffic associated with daily usage of an average device (e.g., a NAND device) may be organized into three classes, including metadata, hot data, and cold data. Metadata (e.g., control data for a file system) may be overwritten relatively often (e.g., without unmapping the corresponding logical address between writes to the logical address). Metadata may be used to define a file header in a storage system, to index or search content in a storage system, for other control data, or a combination thereof. A response time associated with writing or retrieving data in a storage system may be improved as a speed for accessing the metadata for the storage system increases. As such, metadata may be associated with a high level of usage (e.g., a high overwrite frequency). In some examples, metadata may be associated with a relatively small quantity of logical addresses (e.g., a small logical address footprint of 300 megabytes (MB)).

Data that is different from metadata, but is overwritten relatively frequently (e.g., associated with higher overwrite statistics) may be referred to as hot data. In some examples, hot data may be associated with more logical addresses than metadata (e.g., a medium or large logical address footprint of 32 GB). Other data that may not be overwritten relatively frequently, or may not be overwritten at all, may be referred to as cold data. For example, some data may not be overwritten until an unmap operation (e.g., an operation to reset one or more logical addresses in response to data being removed) resets the mapped status of the logical address associated with the data.

Due to the relatively higher level of usage associated with metadata and hot data, writing metadata, hot data, or both (e.g., depending on storage space), to higher performance portions of a memory array may result in increased memory device performance. For example, higher performance portions of the memory array, such as SLC, may be associated with more efficient garbage collection operations than lower performance portions of the memory array, such as TLC, MLC, QLC, or the like. Because more frequent garbage collection operations may be performed for logical addresses that are associated with metadata and hot data, storing hot data and metadata in the higher performance memory may result in faster and more reliable data access (e.g., based on or in response to the garbage collection). However, by determining where to write data based on or in response to a size of the data, or using one or more other techniques, a memory device may fail to account for a level of usage associated with the data, which may increase latency and reduce reliability associated with operations performed by the memory device (e.g., if more frequently rewritten data is stored in lower performance memory, or vice versa).

As described herein, a memory device may identify a usage level for a logical address and determine whether to write the data associated with the logical address to higher performance memory or lower performance memory based on or in response to the level of usage, among other factors. As illustrated in the L2P table 200, a L2P entry 210 associated with a logical address may include a level of usage field 220. The level of usage field 220, which may be referred to as an HC field, may be configured to store a value indicative of a quantity (e.g., frequency) of writes or over-writes associated with the logical address (e.g., a quantity of times the logical address has been remapped). The memory device may determine where to write the data (e.g., a physical address for writing the data) based on or in response to a value of the level of usage field 220 within the L2P entry 210, for the corresponding logical address.

The memory device may update the level of usage field 220 in response to each write command received for a logical address (e.g., for a respective L2P entry 210). For example, if the memory device receives a write command, the memory device may determine a type of the data indicated in the write command, a mapping status associated with the logical address indicated in the write command, an alignment of the logical address with a range of data or a data log within the memory array, or a combination thereof, which may be represent one or more parameters associated with the logical address. The memory device may utilize one or more processes to determine a value, or to determine whether to update the value, of the level of usage field 220. The processes may include the one or more parameters associated with the logical address. The memory device may subsequently use the updated L2P entry 210 and the value of the level of usage field 220 to perform the write operation. In some examples, the memory device may not access the L2P entry 210 while a write command is being serviced or performed, and the memory device may update the level of usage field 220 after (e.g., in response to) performing the write procedure. In such cases, the memory device may use the updated L2P entry 210 and the updated value of the level of usage field 220 to perform a subsequent write operation. The one or more processes for determining the level of usage value are described herein and in greater detail with reference to FIGS. 3 and 4.

The level of usage field 220 may include a set of bits for conveying overwrite information associated with the logical address. Although the level of usage field 220 is illustrated including four bits of data, it is to be understood that the level of usage field 220 may include any quantity of bits. The quantity of bits in the level of usage field 220 may be determined by a density of a corresponding memory array, a quantity of bits within the physical address field 225 for conveying the pointer to the physical address, a size of the L2P entry 210, or any combination thereof. In some examples (e.g., in memory devices having relatively high memory densities), the quantity of bits within the physical address field 225 may be greater than the 11 bits illustrated in FIG. 2, and the quantity of bits within the level of usage field 220 may be less than the four bits illustrated in FIG. 2 (e.g., one bit, two bits, or three bits). Additionally or alternatively, if the memory device is associated with a relatively low memory density, the quantity of bits within the physical address field 225 may decrease and the quantity of bits within the level of usage field 220 may increase (e.g., five bits, nine bits). In some examples, the quantity of bits within the L2P entry 210 may be greater than or less than the 16 bits illustrated in FIG. 2. In some examples, the mapping indication field may include one or more bits indicative of whether the logical address is mapped or unmapped.

The memory device may utilize the one or more processes and the corresponding parameters associated with the logical address to determine whether to maintain the value of the level of usage field 220, increment the value, decrement the value, or set each bit in the field high or low (e.g., set the value to a maximum or minimum value). For example, if the memory device determines that the type of data indicated in the write command is metadata, forced unit access (FUA) data, or other prioritized data, the memory device may set each bit in the level of usage field 220 high (e.g., to a value of '1') to indicate a relatively high level of usage associated with the data. If the memory device determines that the logical address is unmapped (e.g., a value of the mapping indication field 215 is set low, or to a value of '0'), the memory device may set each bit in the level of usage field 220 low (e.g., to a value of '0') to indicate a relatively low (e.g., zero) level of usage associated with the data (e.g., because the logical address is unmapped, the memory device may assume the logical address has not been written to). If the memory device determines that the data is not prioritized data and the logical address is mapped (e.g., a value of the mapping indication field 215 is set low), the memory device may increment the value of the level of usage field 220 (e.g., increment the value conveyed by the bits within the field by one). Other methods for determining the level of usage value are described in further detail with reference to FIGS. 3 and 4.

The memory device may use the value conveyed by the level of usage field 220 in the L2P entry 210 to determine where to store (e.g., write) the data. For example, if the bits in the level of usage field are each set low (e.g., in the example of FIG. 2, the bits may be set to '0000' which may be indicative of a level of usage value of zero), the level of usage value may indicate that the logical address may be rarely, or never, overwritten (e.g., the logical address may be associated with cold data). Accordingly, the memory device may write the corresponding data to lower performance memory. If the bits in the level of usage field 220 are each set high (e.g., in the example of FIG. 2, the bits may be set to '1111' which may be indicative of a level of usage value of 15), the level of usage value may indicate that the logical address may be frequently overwritten (e.g., associated with hot contents, metadata, FUA data, or other prioritized data). The memory device may write the corresponding data to higher performance memory accordingly. In some examples, any non-zero value of the level of usage field 220 may indicate hot data, and in some examples, any value of the level of usage field 220 over a threshold may indicate hot data.

A larger quantity of bits within the level of usage field 220 may correspond to a higher granularity for indicating hot data than a smaller quantity of bits. For example, if the level of usage field 220 includes one bit, the level of usage field 220 may indicate hot data if the bit is set (e.g., a relatively large footprint or chunk of hot data, such as approximately 16 GB or more) and cold data if the bit is not set, which may reduce granularity (e.g., a level of accuracy) associated with determining a level of usage. If the level of usage field 220 includes three bits, the level of usage may be conveyed with an increased granularity as compared with the single bit, which may provide for a more accurate differentiation between hot data and cold data (e.g., which may provide for a smaller footprint or chunk size associated with the hot data, such as approximately 4 GB or less).

In some examples, the memory device may use a threshold for determining where to write data. For example, any logical address associated with a level of usage field 220 having a satisfying the threshold (e.g., at or above the threshold) may be considered a hot logical address and may be associated with higher performance memory. Similarly, any logical address associated with a value below the threshold may be considered a cold logical address and may be associated with lower performance memory.

The threshold may be configured according to an amount of space available (e.g., a quantity of available physical addresses of the memory array). For example, the threshold may be based on or in response to an amount of space available within the higher performance memory of the memory array (e.g., a quantity of blocks of SLC that are available), an amount of hot contents that are generated (e.g., generated by a user during operation of the memory device), or both. The amount of high-performance memory space that is available may change during operation of the memory device in response to a quantity of hot contents that are written to the high-performance memory array, and the memory device may dynamically change the threshold value accordingly. The memory device may configure a starting threshold that is relatively high (e.g., each bit set to one), and the memory device may change (e.g., decrease) the threshold as an amount of available space changes.

If the memory device updates the level of usage field 220 in response to a write command and subsequently identifies that the value conveyed by the level of usage field 220 satisfies (e.g., equals or exceeds) the threshold, the memory device may write the corresponding data to a higher performance portion of the memory array. If the value conveyed by the level of usage field 220 does not satisfy the threshold, the memory device may write the corresponding data to a lower performance portion of the memory array. In one example, the threshold may be set to a value of 14 (e.g., '1110') and the memory device may write data to the high performance memory if the value conveyed by the level of usage field is greater than or equal to 14 (e.g., greater than or equal to '1110').

In some examples, if the memory device writes hot data or metadata to higher performance memory, the hot data or metadata may remain in the higher performance memory during one or more garbage collection operations. For example, if the level of usage field associated with the respective logical addresses is relatively high (e.g., at or above the threshold), the memory device may retain the data within the higher performance portions of a memory array throughout a lifetime of the data (e.g., until a corresponding logical address is unmapped), which may improve a reliability of the written data stored within the memory array.

Accordingly, a memory device may maintain level of usage information (e.g., write frequency information) associated with a logical address by updating a field in a L2P table 200 that is configured as a level of usage field 220. The memory device may determine whether to write data to a higher performance portion of a memory array or a lower performance portion of the memory array according to the value of the level of usage field 220, which may provide for efficient utilization of high performance memory and improved reliability associated with operations of the memory device.

Figure 3:
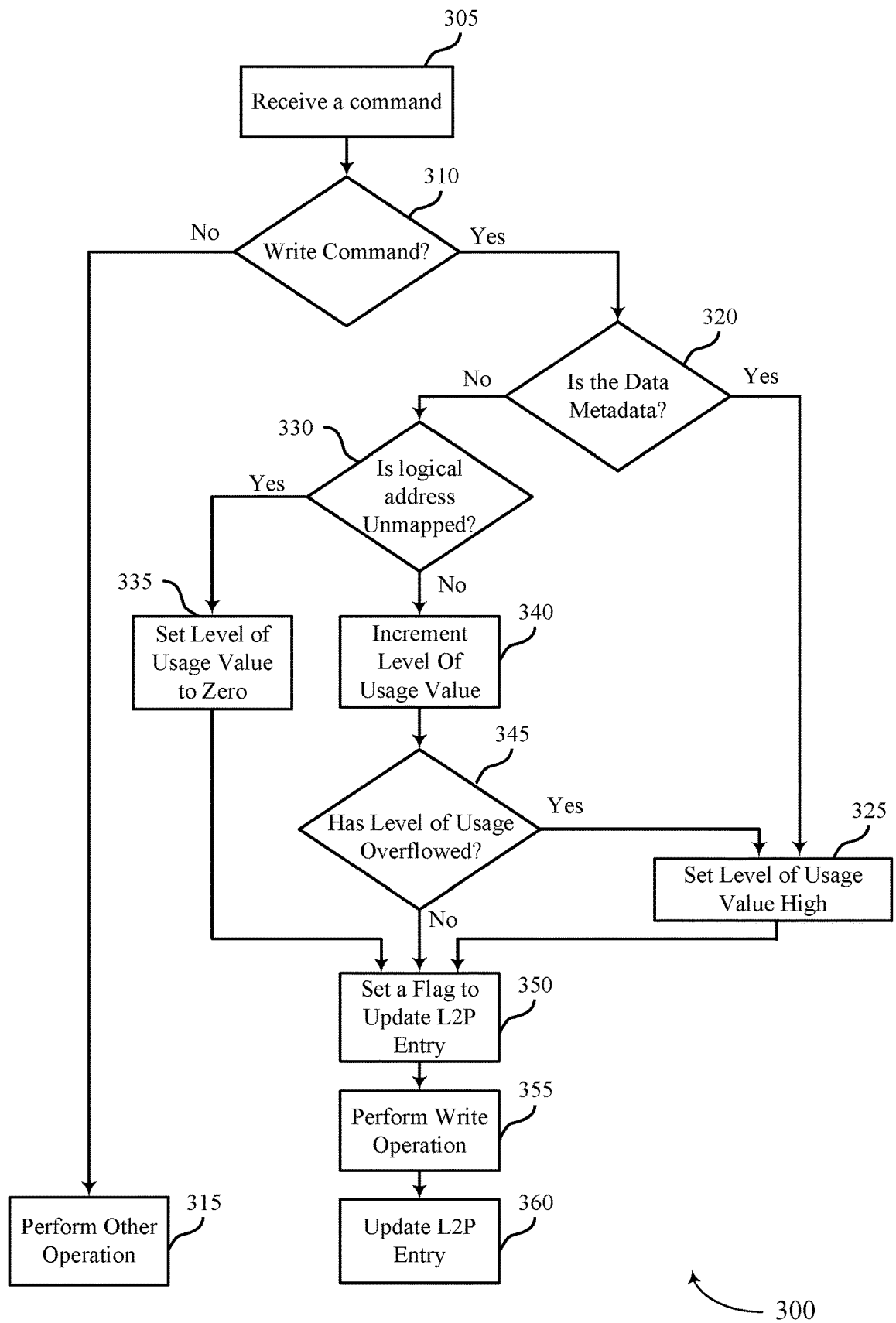
FIG. 3 illustrates an example of a flow diagram that supports usage level identification for memory device addresses in accordance with examples as disclosed herein.

FIG. 3 illustrates an example of a flow diagram 300 that supports usage level identification for memory device addresses in accordance with examples as disclosed herein. The flow diagram 300 may implement operations of a memory device in response to receiving a command, as described with reference to FIGS. 1 through 2. The flow diagram 300 may illustrate operations performed by a memory device according to a first process to determine a value associated with a level of usage of a logical address. The level of usage value may be stored within a level of usage field within a L2P entry, as described with reference to FIG. 2.

In some examples, the first process may apply to (e.g., be configured for) one or more file systems (e.g., EXT4 file systems, or some other type of file systems) of the memory device. A file system may operate according to a write pattern of the memory device. For example, the memory device may create a file to store data by allocating metadata for the file (e.g., inodes, pointers, data pre-allocation, or a combination thereof), and the memory device may write or overwrite data to the file (e.g., contents of the file). If the file is removed, the memory device may perform an unmap operation to unmap and release the corresponding logical addresses (e.g., the logical addresses associated with the contents of the file may be unmapped and reused). In some examples, a file system may delay or anticipate write operations. For example, some file systems (e.g., F2FS file systems) may anticipate operations such as data write operations (e.g., before metadata updates).

Aspects of the flow diagram 300 may be implemented by a controller, among other components. Additionally or alternatively, aspects of the flow diagram 300 may be implemented as instructions stored in memory (e.g., firmware stored in a memory coupled with the memory device). For example, the instructions, when executed by a controller (e.g., a local controller 135), may cause the controller to perform the operations of the flow diagram 300.

Alternative examples of the flow diagram 300 may be implemented in which some operations are performed in a different order than described or are not performed at all. In some cases, operations may include features not mentioned below, or additional operations may be added.

At 305, an access command is received. For example, the memory device may receive the access command from a host system. The access command may be received at a controller or other component of the memory device. At 310, it may be determined whether the command is a write command. In some examples, at 315, another operation may be performed based on or in response to determining the command is not a write command. For example, the memory device may perform a read operation, or an unmap operation, which may include unmapping the logical address (e.g., if a file to which the logical address was previously mapped is removed) and setting the mapping indication field in a corresponding L2P entry to indicate the logical address is unmapped.

At 320, if the memory device determines that the command is a write command, it may be determined whether the data is metadata. In some examples, the memory device may identify a metadata flag within the issued write command and determine whether the metadata flag is set (e.g., in SCSI write operations, such as SCSI WRITE_10 or WRITE_16 operations, the memory device may determine whether the SYSTEM_DATA_TAG group ID number is set). At 325, if the memory device determines that the data is metadata (e.g., based on or in response to determining that the metadata flag is set), the value of the level of usage field may be set high. For example, the memory device may set each bit within the level of usage field of the L2P table high (e.g., to a value of '1') to indicate the data is metadata (e.g., frequently accessed data).

At 330, if the memory device determines that the data is not metadata (e.g., or other prioritized data), it may be determined whether the logical address is unmapped. For example, the memory device may identify whether the one or more bits of the mapping indication field within the L2P entry for the logical address are set (e.g., whether the one or more bits of the mapping indication field indicate that the logical address is mapped or unmapped).

At 335, if the memory device determines that the logical address is unmapped, the level of usage value may be set to zero by setting each bit within the level of usage field of the L2P entry low (e.g., to a value of '0'). The memory device may set the level of usage value to zero to indicate that the logical address has not yet been written to (e.g., because the logical address is unmapped).

At 340, if the memory device determines that the logical address is mapped, the level of usage value may be incremented from a first value to a second value. For example, the memory device may increment the bits (e.g., HC bits) of the level of usage field by one (e.g., or by some other quantity). The memory device may increment the level of usage value to indicate that the data associated with the logical address will be remapped during the present write operation, for example, after having been previously mapped.

At 345, it may be determined whether the level of usage value has overflowed.

For example, the memory device may determine whether the level of usage value has overflowed by determining whether the level of usage value is greater than a value (e.g., a maximum value) that may be conveyed by the set of bits within the level of usage field of the L2P entry. For example, if the quantity of bits in the level of usage field is four, the value that may be conveyed is 15 (e.g., '1111') and any value above 15 (e.g., '1111') may be considered to be overflowed and the memory device may proceed to 325.

At 325, if the level of usage value has overflowed, the level of usage value may be set high (e.g., set each bit in the field high). In one example, if the quantity of bits in the level of usage field is four, and the level of usage value is greater than 15 (e.g., '1111'), the memory device may determine that the level of usage value has overflowed, and the memory device may set the level of usage value to 15 (e.g., '1111') by setting each bit in the level of usage field high. In some examples, at 325, the memory device may identify that the value of the level of usage field is set high, and the memory device may maintain the value (e.g., '1111').

At 350, a flag may be set to update the L2P entry. The memory device may set a flag to update the level of usage field within the L2P entry according to the value determined using the first process. In one example, the memory device may set a flag to update the L2P entry with a level of usage value of zero in response to determining the logical address is unmapped at 330. In another example, the memory device may set a flag to update the L2P entry with a high level of usage value (e.g., a maximum value) in response to determining the data is metadata at 320 or that the level of usage value overflowed at 345. In another example, the memory device may set a flag to update the L2P entry with another level of usage value in response to incrementing the level of usage value at 340 and determining the level of usage value did not overflow at 345.

At 355, the write operation may be performed according to the L2P entry and the corresponding level of usage value. The memory device may determine where to write the data based on or in response to the level of usage value, as described with reference to FIG. 2. For example, if the level of usage value satisfies a threshold, the memory device may write the data to a higher performance portion of a memory array (e.g., the memory device may map the logical address to a physical address within the higher performance portion of the memory array), and if the level of usage value does not satisfy the threshold, the memory device may write the data to a lower performance portion of the memory array (e.g., the memory device may map the logical address to a physical address that is within the lower performance portion of the memory array).

At 360, the L2P entry may be updated in response to the flag set at 350. The memory device may update a value of the level of usage field of the L2P entry in accordance with the flag set at 350. In some examples, the L2P entry may not be available to the memory device while a write command is being serviced or performed (e.g., after a write command is received). Accordingly, the L2P entry may be updated at a time after the write command is performed at 355. In some examples, the memory device may reference the updated L2P entry and corresponding level of usage value to perform a subsequent write procedure.

Accordingly, the memory device may determine a level of usage value associated with a logical address and map the logical address to a physical address based on or in response to the level of usage, which may improve reliability of data stored by the memory device and reduce latency as compared with a memory device that maps the logical address based on or in response to data chunk sizes, among other techniques.

Figure 4:
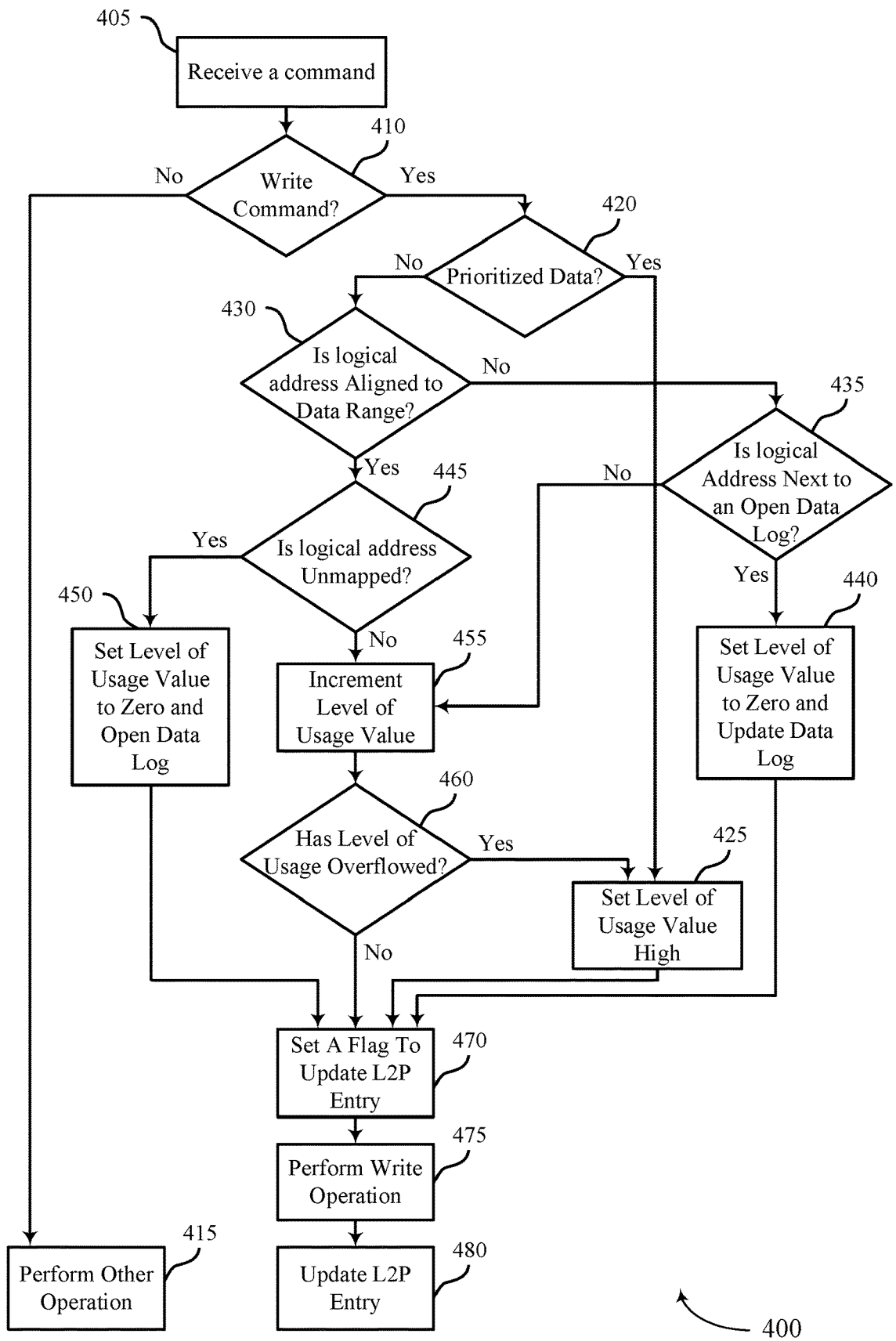
FIG. 4 illustrates an example of a flow diagram that supports usage level identification for memory device addresses in accordance with examples as disclosed herein.

FIG. 4 illustrates an example of a flow diagram 400 that supports usage level identification for memory device addresses in accordance with examples as disclosed herein. The flow diagram 400 may illustrate operations performed by a memory device according to a second process to determine a value associated with a level of usage of a logical address. The second process may be utilized by the memory device in addition to or as an alternative to the first process described with reference to FIG. 3. The second process may apply to (e.g., be configured for) a second type of file system (e.g., F2FS file systems, EXT4 file systems configured with file pre-allocations, or other types of file systems) of the memory device. For example, the second process may leverage a logging system that may be used by a memory device for a second type of file system. The logging system may be described herein, and in greater detail with reference to FIG. 5. It is to be understood that the second process may apply to (e.g., be used by) one or more other types of file systems that are not described or illustrated herein.

Aspects of the flow diagram 400 may be implemented by a controller, among other components. Additionally or alternatively, aspects of the flow diagram 400 may be implemented as instructions stored in memory (e.g., firmware stored in a memory coupled with the memory device). For example, the instructions, when executed by a controller (e.g., a local controller 135 of a memory device 130), may cause the controller to perform the operations of the flow diagram 400.

Alternative examples of the flow diagram 400 may be implemented in which some operations are performed in a different order than described or are not performed at all. In some cases, operations may include features not mentioned below, or additional operations may be added.

At 405, an access command is received. For example, the memory device may receive the access command from a host system. The access command may be received at a controller or other component of the memory device. At 410, it may be determined whether the command is a write command. In some examples, at 415, in response to determining that the command is not a write command, another operation may be performed. For example, if the command is an unmap command, the memory device may perform an unmap operation, which may include unmapping the logical address (e.g., if a file to which the logical address was previously mapped is removed) and setting the mapping indication field in a corresponding L2P entry to indicate the logical address is unmapped. If the command is a read command, the memory device may read data from a memory array.

At 420, if the command is a write command, it may be determined whether the data is prioritized data, such as metadata, FUA, other prioritized data, or a combination thereof. In some examples, the memory device may identify a metadata flag within the issued write command and determine whether the metadata flag is set (e.g., in SCSI write operations, such as SCSI WRITE_10 or WRITE_16 operations, the memory device may determine whether the SYSTEM_DATA_TAG group ID number is set). Additionally or alternatively, the memory device may determine whether the write command indicates an FUA flag is set (e.g., in some file systems, the FUA flag may indicate whether the data is to be stored directly in MNAND memory at a write checkpoint of the file system). At 425, the level of usage value may be set high if the data is prioritized data. For example, the memory device may set each bit within the level of usage field of the L2P table high (e.g., to a value of '1') to indicate the data is prioritized data (e.g., frequently accessed data).

At 430, if the memory device determines that the data is not prioritized data, it may be determined whether the logical address (e.g., an LBA) is aligned to a data range. For example, the memory device may identify an ending position of the logical address within a memory array of logical addresses, and the memory device may determine whether the ending position of the logical address is at or before the end of a block of data within the data range (e.g., a 2 MB data block, or some other data block size that may be configured as a data log within the second type of file system).

Determining whether the logical address is aligned to the data range based on or in response to the second process may reduce latency, processing resources, and power consumption for a memory device that operates according to the second type of file system (e.g., F2FS, EXT4 with file pre-allocations, or other file systems). For example, such file systems may be configured to support file system logs, which may be sequential streams of data. The file systems may store data within an allocated segment (e.g., a data range or data block) until the segment is full. The file systems may store remaining data within a next segment that is associated with a sequential logical address. By determining whether the logical address is aligned to one of the data ranges (e.g., identifying and tracking writing points within the file system), the memory device (e.g., a flash transition layer (FTL) of the memory device) may identify hot data from newly written data (e.g., cold data), and the memory device may refrain from checking the mapping indication field within a respective L2P entry for each write command, which may reduce processing.

At 435, if the memory device determines the logical address is not aligned to the data range (e.g., the ending position of the logical address is after the end of the data range), it may be determined whether the logical address is next to (e.g., contiguous to) an open data log within the file system. For example, the memory device may determine whether the logical address is a next sequential logical address (e.g., within the sequential log of logical addresses of the corresponding file system) of an open data log of the memory array. Details of the sequential log of logical addresses are described in further detail with respect to FIG. 5.

At 440, if the memory device determines that the logical address is the next sequential logical address of the open data log (e.g., an open log session within the file system), the level of usage value may be set to zero and the open data log may be updated. The memory device may update the open data log using an update log function that may update the open data log with the logical address and a size of the data.

At 445, if the memory device determines that the logical address is aligned at or before the end of the data range, it may be determined whether the logical address is unmapped. The memory device may identify whether one or more bits of the mapping indication field within the L2P entry for the logical address are set to determine whether the logical address is unmapped. The memory device may refrain from checking the mapping indication field within the L2P entry for each write command by determining whether the logical address is aligned with the data range at 430, which may reduce processing and latency. In one example, if the data range is a 2 MB data range, the memory device may check the mapping indication field for an average of one logical address out of every 512 logical addresses that are written (e.g., a 0.2% occurrence).

At 450, if the memory device determines that the logical address is unmapped, the level of usage value may be set to zero (e.g., set each bit within the level of usage field low) and a new data log may be opened for the memory array. The memory device may set the level of usage value to zero to indicate that the logical address has not yet been written to (e.g., because the logical address is unmapped). The memory device may perform an open log function to open the new data log. The open log function may set a logical address of the new data log to the logical address associated with the data to be written, such that the memory device may write the data to the new data log.

At 455, if the memory device determines that the logical address is mapped (e.g., the logical address is already included in an open data log, as determined at 445), or if the memory device determines that the logical address is not next to an open log (e.g., at 435), the level of usage value may be incremented from a first value to a second value. For example, the memory device may increment the bits (e.g., HC bits) of the level of usage field by one (e.g., or some other quantity). The memory device may increment the level of usage value to indicate that the logical address associated with the open data log will be remapped during the current write operation, after having been previously mapped.

At 460, it may be determined whether the level of usage value has overflowed. The memory device may determine whether the level of usage value has overflowed by determining whether the level of usage value is greater than a value (e.g., a maximum value) that may be conveyed by the set of bits within the level of usage field of the L2P entry. For example, if the quantity of bits in the level of usage field is four, the value that may be conveyed is 15 (e.g., '1111'). If the level of usage value has overflowed, the memory device may proceed to 425.

At 425, if the level of usage value has overflowed, the level of usage value may be set high (e.g., set each bit in the field high). In one example, if the quantity of bits in the level of usage field is four, and the level of usage value is greater than 15 (e.g., '1111'), the memory device may determine that the level of usage value has overflowed, and the memory device may set the level of usage value to 15 (e.g., '1111') by setting each bit in the level of usage field high. In some examples, at 425, the memory device may identify that the value of the level of usage field is set high (e.g., to the maximum value), and the memory device may maintain the value.

At 470, a flag may be set to update the L2P entry. The memory device may set a flag to update the level of usage field within the L2P entry based on or in response to the value determined using the second process. In one example, memory device may set a flag to update the L2P entry with a level of usage value of zero in response to determining the logical address is unmapped or that the logical address is next to an open data log. In another example, the memory device may set a flag to update the L2P entry with a high level of usage value in response to determining the data is prioritized data or that the level of usage value overflowed. In another example, the memory device may set a flag to update the L2P entry with another level of usage value in response to incrementing the level of usage value at 455 and determining that the level of usage value did not overflow at 460.

At 475, the write operation may be performed according to the L2P entry and the corresponding level of usage value. The memory device may determine where to write the data based on or in response to the level of usage value, as described with reference to FIG. 2. For example, if the level of usage value satisfies a threshold, the memory device may write the data to a higher performance portion of a memory array (e.g., the memory device may map the logical address to a physical address within the higher performance portion of the memory array), and if the level of usage value does not satisfy the threshold, the memory device may write the data to a lower performance portion of the memory array (e.g., the memory device may map the logical address to a physical address that is within the lower performance portion of the memory array).

At 480, the L2P entry may be updated in response to the flag set at 470. The memory device may update a value of the level of usage field of the L2P entry in accordance with the flag set at 470. In some examples, the L2P entry may not be available to the memory device while a write command is being performed (e.g., after a write command is received). Accordingly, the L2P entry may be updated at a time after the write command is performed at 475. In some examples, the memory device may reference the updated L2P entry and corresponding level of usage value to perform a subsequent write procedure.

Accordingly, the memory device may determine a level of usage value associated with a logical address based on or in response to one or more parameters associated with the logical address. The memory device may map the logical address to a physical address based on or in response to the level of usage, which may improve reliability of the memory device and reduce latency as compared with a memory device that maps the logical address based on or in response to data chunk sizes, or other techniques. Additionally or alternatively, by determining whether the logical address is aligned with a block of a memory array (e.g., a sequential data range or data stream within a memory array), the memory device (e.g., an FTL engine of the memory device) may refrain from checking an L2P entry after each write command to determine whether the corresponding logical address is mapped, which may provide for reduced latency and power consumption.

Figure 5:
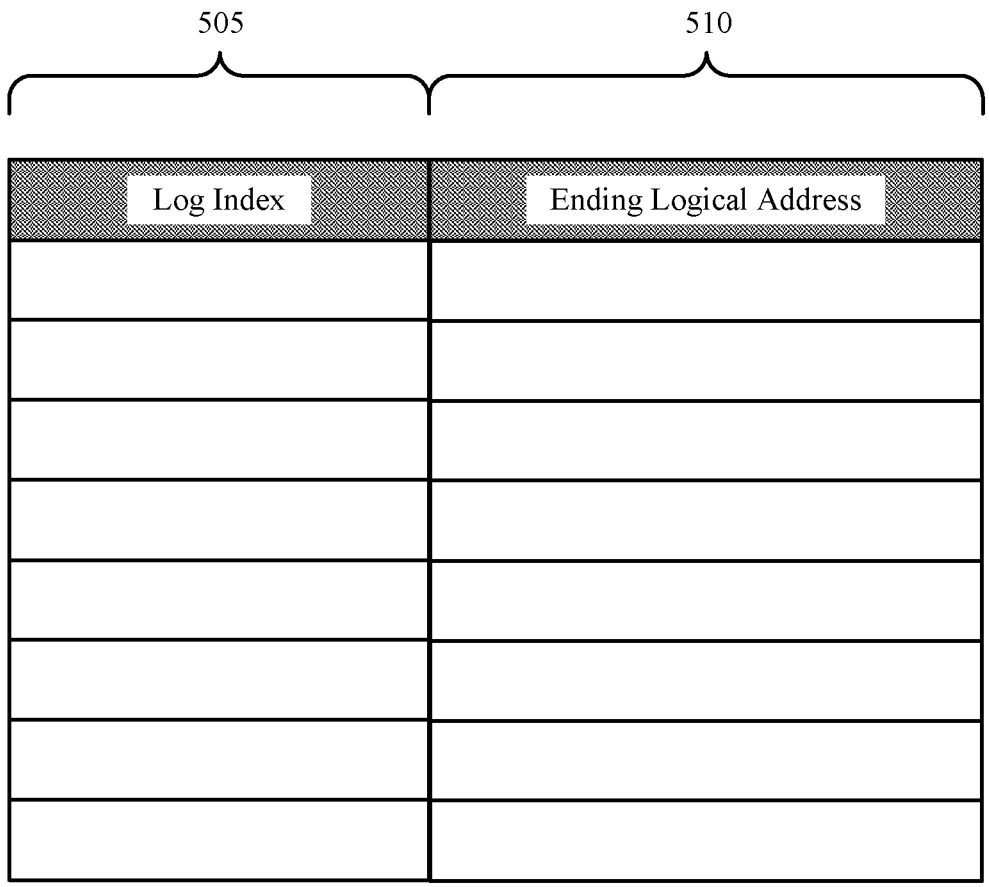
FIG. 5 illustrates an example of a data log table that supports usage level identification for memory device addresses in accordance with examples as disclosed herein.

FIG. 5 illustrates an example of a data log table 500 that supports usage level identification for memory device addresses in accordance with examples as disclosed herein. The data log table 500 may be maintained by a memory device operating according to a second type of file system (e.g., a file system that may utilize a data logging mechanism), as described with reference to FIG. 4. The memory device may update one or more entries within the data log table 500 in response to one or more of the methods described with reference to the second process and the flow diagram 400.

As described with reference to FIG. 4, some file systems (e.g., F2FS, Verilog file systems, or other file systems) may utilize a logging system, in which data may be written to files using sequential data logs. Each data log may be a sequential stream of data, and the file system may maintain a quantity (e.g., six, or some other quantity) of data logs at a time. If writing data, a memory device may write data to a first data log of the file system until the data log is full, at which point the memory device may close the first data log and open a new data log within the file system, or switch to an already opened data log. An ending logical address of the first data log may be next to a sequential logical address of the new or opened data log. The memory device may write the remaining data to the new or opened data log accordingly. A data log may include an allocated segment of data (e.g., 2 MB of data, or some other size of data block). In some examples, each data log within a memory system may include the same data block size.

As described herein, a memory device and corresponding file system within the memory device may maintain a data log table 500 that may include a list of open data logs (e.g., logs opened by the file system during a working mode of the file system). The data log table 500 may include a first list 505 of log indices and a second list 510 of an ending logical address of each respective open data log. Each log index entry within the first list 505 may indicate a starting logical address (e.g., LBA) of a respective data log, a data log size, or both. Each ending logical address entry within the second list 510 may indicate an ending logical address of a last write operation performed on the respective data log.

As described with reference to FIG. 4, the memory device may reduce processing and power consumption by identifying an alignment of a logical address with one of the data ranges within the file system to determine whether data is hot data or newly written data (e.g., cold data). For example, by identifying newly written data in response to determining the ending position of the logical address associated with the data is at or after a data range, and determining that the logical address is next to a sequential logical address of an open data log (e.g., the logical address is associated with a beginning of a data log), the memory device may refrain from checking a mapping indication field of a corresponding L2P entry, which may reduce latency and processing by the memory device.

The entries within the first list 505 and the second list 510 of the data log table 500 may be updated in response to one or more functions performed by the memory device. The memory device may update the data log table 500 while operating according to the second process, as described with reference to FIG. 4. For example, the memory device may open a new data log, update an existing data log (e.g., with a new logical address and a new size of data), close a data log, or perform one or more other operations to manage the data logs within the file system.

In one example, with reference to the flow diagram 400, at 450, the memory device may perform an open data log function in response to determining that a logical address is unmapped. The open data log function (e.g., OpenLog(lba, chunk)) may instruct the memory device (e.g., a file system of the memory device) to determine a size of the data log table 500 (e.g., a quantity of entries within the first list 505 and the second list 510) and enter a new log index entry within the first list 505 to indicate an index of the new data log to be opened (e.g., the index may be set to the logical address of the write data divided by the size of the data log). The open data log function may instruct the memory device to enter a new ending logical address entry in the second list 510 that is associated with the new log index entry. The memory device may set the new ending logical address entry to be a value equal to the starting logical address of the data to be written in addition to the size of the write data. The open data log function may increment the size of the data log table 500 by one after entering the new data log entries.

In another example, with reference to the flow diagram 400, at 435 and 440, the memory device may perform an update data log function to determine whether the logical address of the write data is next to an open data log and update an open data log in response to determining the logical address is next to a sequential logical address of the open data log. The update data log function (e.g., UpdateLog (lba, chunk)), may instruct the memory device to calculate a log index of the open data log (e.g., the memory device may calculate the log index to be a value of a floor value of the write data divided by the size of the data log). The update function may instruct the memory device to loop through the data log table 500 to determine whether the log index of the open data log is within the first list 505 and whether the ending logical address within the second list 510 that corresponds to the log index of the open data log is the same as the logical address for the data to be written. In response to determining that the logical address is next to the ending logical address of the open data log, the function may instruct the memory device to update the ending logical address entry within the second list 510 to a value equal to the logical address of the write data in addition to a size of the write data (e.g., LogTable[i].last_written_lba=lba+chunk).

In some examples, the memory device may perform a close data log function to close an open data log and unmap the logical addresses associated with the data log. The update log function may instruct the memory device to determine whether the data log is full (e.g., the memory device may determine whether a modulo value of the data of the last written logical address of the table divided by the size of the data log is zero). The update log function may instruct the memory device to perform the close data log function if the data log is full. The close data log function (e.g., CloseLog(log, index)) may instruct the memory device to reduce the size of the data log table 500 by one (e.g., LogTable.size=LogTable.size-1) and delete the last log index entry within the first list 505 and the last ending logical address entry within the second list 510.

Accordingly, a memory device and corresponding file system may utilize data logs associated with sequential logical addresses to store data within a memory array. The memory device may determine where to write data within the memory array in response to a comparison of a logical address associated with the data and a range of data (e.g., a block size) within each sequential data log. The memory device may refrain from checking an L2P entry for the corresponding logical address unless the logical address is aligned with the data range, which may reduce processing and power consumption by the memory device.

Figure 6:
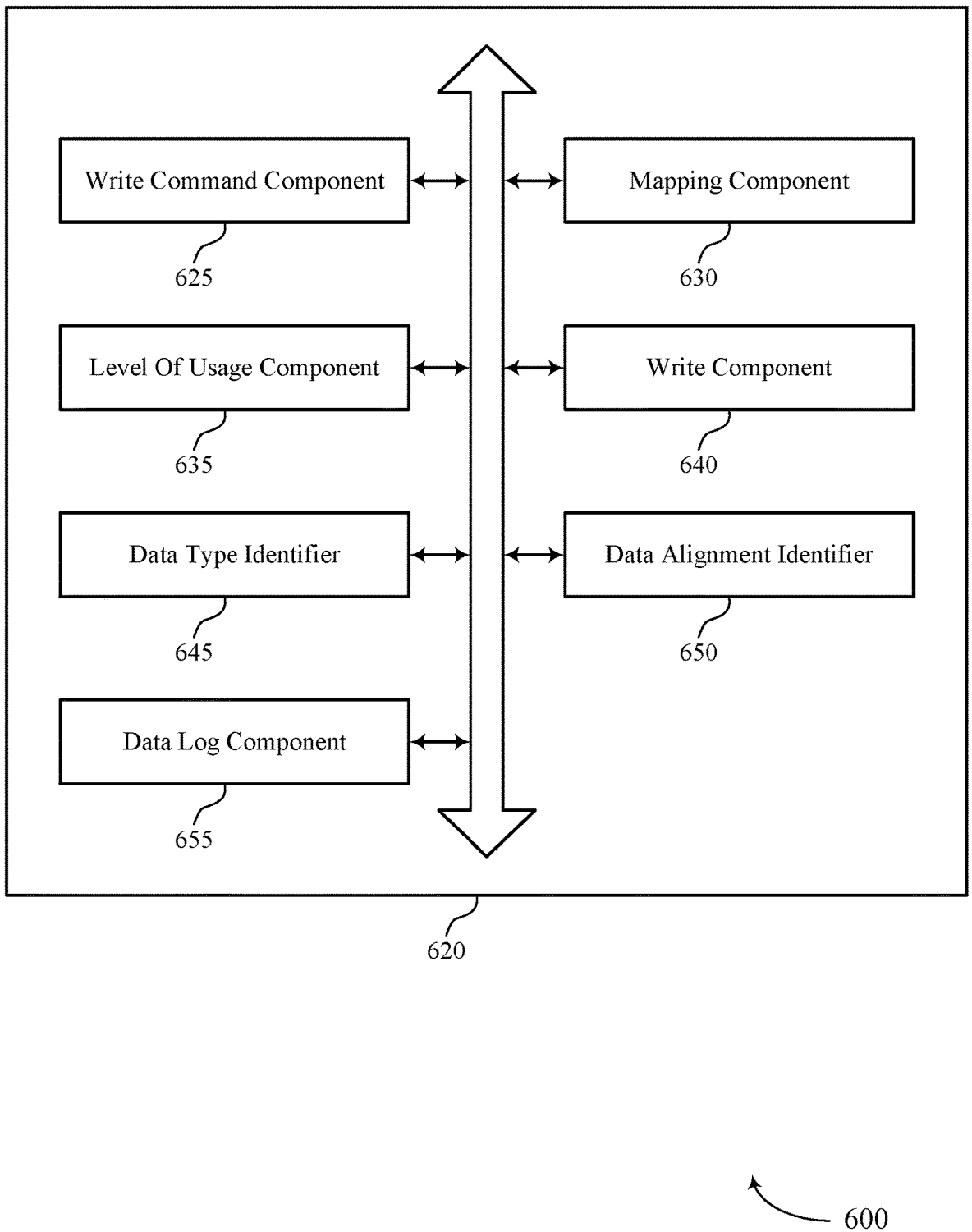
FIG. 6 shows a block diagram of a memory device that supports usage level identification for memory device addresses in accordance with examples as disclosed herein.

FIG. 6 shows a block diagram 600 of a memory device 620 that supports usage level identification for memory device addresses in accordance with examples as disclosed herein. The memory device 620 may be an example of aspects of a memory device as described with reference to FIGS. 1 through 5. The memory device 620, or various components thereof, may be an example of means for performing various aspects of usage level identification for memory device addresses as described herein. For example, the memory device 620 may include a write command component 625, a mapping component 630, a level of usage component 635, a write component 640, a data type identifier 645, a data alignment identifier 650, a data log component 655, or any combination thereof. Each of these components may communicate, directly or indirectly, with one another (e.g., via one or more buses).

The write command component 625 may be configured as or otherwise support a means for receiving, at the memory device, a write command indicating data to be written, a type of the data, and a logical address of a memory array for writing the data. The mapping component 630 may be configured as or otherwise support a means for identifying a first entry associated with the logical address in a table that includes a mapping between logical addresses and physical addresses of the memory array, the first entry including a first field indicating a level of usage of the logical address. The level of usage component 635 may be configured as or otherwise support a means for setting, based on the type of the data, a value for the first field to indicate the level of usage. The write component 640 may be configured as or otherwise support a means for writing the data to a physical address of the memory array based on the write command and setting the value for the first field.

In some examples, to support setting the value, the level of usage component 635 may be configured as or otherwise support a means for setting a first value for the first field based on the type of the data being a first type of data. In some examples, the first type of data includes metadata or prioritized data. In some examples, the first field includes a set of bits for indicating the level of usage, and the first value includes a value of one for each bit of the set of bits.

In some examples, the data type identifier 645 may be configured as or otherwise support a means for determining whether the logical address is unmapped based on the type of the data being different than a first type of data including metadata or prioritized data, where determining whether the logical address is unmapped is based on a value of a second field of the first entry.

In some examples, to support setting the value, the level of usage component 635 may be configured as or otherwise support a means for setting a value of zero for the first field based on determining that the logical address is unmapped.

In some examples, to support setting the value, the level of usage component 635 may be configured as or otherwise support a means for identifying that the first field has a first value. In some examples, to support setting the value, the level of usage component 635 may be configured as or otherwise support a means for incrementing the first value to a second value based on determining that the logical address is mapped.

In some examples, to support setting the value, the level of usage component 635 may be configured as or otherwise support a means for identifying that the first field has a first value based on determining that the logical address is mapped. In some examples, to support setting the value, the level of usage component 635 may be configured as or otherwise support a means for maintaining the first value for the first field based on identifying that the first field has the first value. In some examples, the first field includes a set of bits for indicating the level of usage, and the first value includes a value of one for each bit of the set of bits.

In some examples, the data alignment identifier 650 may be configured as or otherwise support a means for determining an ending position of the logical address relative to an end of a first block of the memory array, the first block having a first size, where determining whether the logical address is unmapped is based on determining that the ending position of the logical address is at or before the end of the first block.

In some examples, the data log component 655 may be configured as or otherwise support a means for opening a new data log for the memory array based on determining that the logical address is unmapped and that the ending position of the logical address is at or before the end of the first block, where the logical address is associated with the new data log.

In some examples, the level of usage component 635 may be configured as or otherwise support a means for determining whether the level of usage satisfies a threshold, where a value of the threshold is based on a quantity of available physical addresses of the memory array.

In some examples, to support performing the write operation, the write component 640 may be configured as or otherwise support a means for writing the data to a first portion of the memory array based on determining that the level of usage satisfies the threshold, where the first portion of the memory array includes the physical address and is associated with a first reliability level higher than a second reliability level associated with a second portion of the memory array.

In some examples, to support performing the write operation, the write component 640 may be configured as or otherwise support a means for writing the data to a second portion of the memory array based on determining that the level of usage fails to satisfy the threshold, where the second portion of the memory array includes the physical address and is associated with a second reliability level lower than a first reliability level associated with a first portion of the memory array.

In some examples, the data alignment identifier 650 may be configured as or otherwise support a means for determining an ending position of the logical address relative to an end of a first block of the memory array, the first block having a first size. In some examples, the data log component 655 may be configured as or otherwise support a means for determining whether the logical address is a next sequential logical address of an open data log of the memory array based on determining that the ending position of the logical address is after the end of the first block.

In some examples, to support setting the value, the level of usage component 635 may be configured as or otherwise support a means for setting a value of zero for the first field based on determining that the logical address is the next sequential logical address of the open data log. In some examples, to support setting the value, the data log component 655 may be configured as or otherwise support a means for updating the open data log with the logical address and a size of the data based on determining the value of zero for the first field.

In some examples, to support setting the value, the level of usage component 635 may be configured as or otherwise support a means for identifying that the first field has a first value. In some examples, to support setting the value, the level of usage component 635 may be configured as or otherwise support a means for incrementing the first value to a second value based on determining that the logical address is different than the next sequential logical address of the open data log.

In some examples, to support setting the value, the level of usage component 635 may be configured as or otherwise support a means for identifying that the first field has a first value based on determining that the logical address is different than the next sequential logical address of the open data log. In some examples, to support setting the value, the level of usage component 635 may be configured as or otherwise support a means for maintaining the first value for the first field based on identifying that the first field has the first value.

Figure 7:
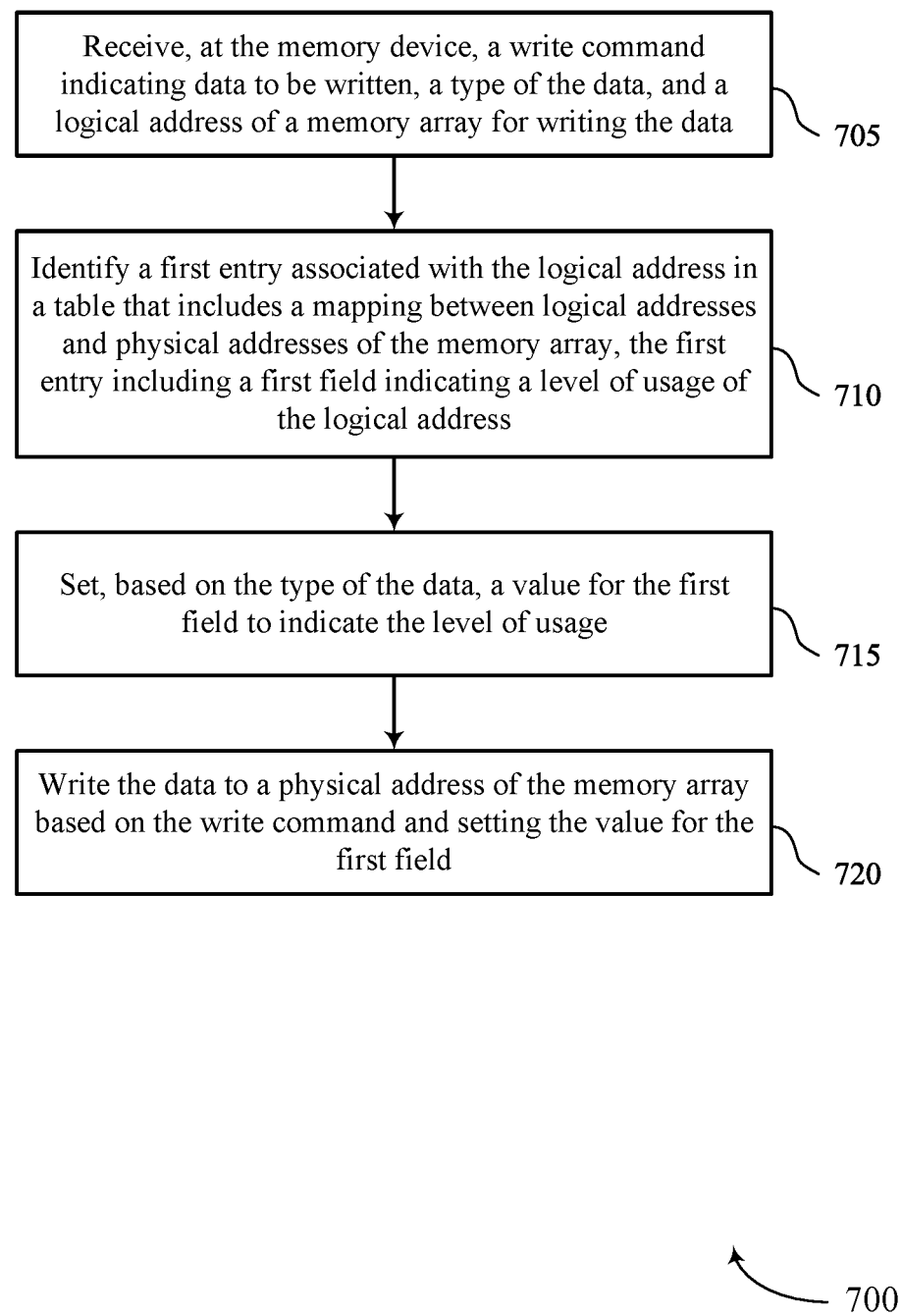
FIG. 7 shows a flowchart illustrating a method or methods that support usage level identification for memory device addresses in accordance with examples as disclosed herein.

FIG. 7 shows a flowchart illustrating a method 700 that supports usage level identification for memory device addresses in accordance with examples as disclosed herein. The operations of method 700 may be implemented by a memory device or its components as described herein. For example, the operations of method 700 may be performed by a memory device as described with reference to FIGS. 1 through 6. In some examples, a memory device may execute a set of instructions to control the functional elements of the device to perform the described functions. Additionally or alternatively, the memory device may perform aspects of the described functions using special-purpose hardware.

At 705, the method may include receiving, at the memory device, a write command indicating data to be written, a type of the data, and a logical address of a memory array for writing the data. The operations of 705 may be performed in accordance with examples as disclosed herein. In some examples, aspects of the operations of 705 may be performed by a write command component 625 as described with reference to FIG. 6.

At 710, the method may include identifying a first entry associated with the logical address in a table that includes a mapping between logical addresses and physical addresses of the memory array, the first entry including a first field indicating a level of usage of the logical address. The operations of 710 may be performed in accordance with examples as disclosed herein. In some examples, aspects of the operations of 710 may be performed by a mapping component 630 as described with reference to FIG. 6.

At 715, the method may include setting, based on the type of the data, a value for the first field to indicate the level of usage. The operations of 715 may be performed in accordance with examples as disclosed herein. In some examples, aspects of the operations of 715 may be performed by a level of usage component 635 as described with reference to FIG. 6.

At 720, the method may include writing the data to a physical address of the memory array based on the write command and setting the value for the first field. The operations of 720 may be performed in accordance with examples as disclosed herein. In some examples, aspects of the operations of 720 may be performed by a write component 640 as described with reference to FIG. 6.

In some examples, an apparatus as described herein may perform a method or methods, such as the method 700. The apparatus may include, features, circuitry, logic, means, or instructions (e.g., a non-transitory computer-readable medium storing instructions executable by a processor) for receiving, at the memory device, a write command indicating data to be written, a type of the data, and a logical address of a memory array for writing the data, identifying a first entry associated with the logical address in a table that includes a mapping between logical addresses and physical addresses of the memory array, the first entry including a first field indicating a level of usage of the logical address, setting, based on the type of the data, a value for the first field to indicate the level of usage, and writing the data to a physical address of the memory array based on the write command and setting the value for the first field.

In some examples of the method 700 and the apparatus described herein, setting the value may include operations, features, circuitry, logic, means, or instructions for setting a first value for the first field based on the type of the data being a first type of data. In some examples of the method 700 and the apparatus described herein, the first type of data includes metadata or prioritized data. In some examples of the method 700 and the apparatus described herein, the first field includes a set of bits for indicating the level of usage, and the first value includes a value of one for each bit of the set of bits.

Some examples of the method 700 and the apparatus described herein may further include operations, features, circuitry, logic, means, or instructions for determining whether the logical address may be unmapped based on the type of the data being different than a first type of data including metadata or prioritized data, where determining whether the logical address may be unmapped may be based on a value of a second field of the first entry.

In some examples of the method 700 and the apparatus described herein, setting the value may include operations, features, circuitry, logic, means, or instructions for setting a value of zero for the first field based on determining that the logical address may be unmapped.

In some examples of the method 700 and the apparatus described herein, setting the value may include operations, features, circuitry, logic, means, or instructions for identifying that the first field may have a first value and incrementing the first value to a second value based on determining that the logical address may be mapped.

In some examples of the method 700 and the apparatus described herein, setting the value may include operations, features, circuitry, logic, means, or instructions for identifying that the first field may have a first value based on determining that the logical address may be mapped and maintaining the first value for the first field based on identifying that the first field may have the first value. In some examples of the method 700 and the apparatus described herein, the first field includes a set of bits for indicating the level of usage, and the first value includes a value of one for each bit of the set of bits.

Some examples of the method 700 and the apparatus described herein may further include operations, features, circuitry, logic, means, or instructions for determining an ending position of the logical address relative to an end of a first block of the memory array, the first block having a first size, where determining whether the logical address may be unmapped may be based on determining that the ending position of the logical address may be at or before the end of the first block.

Some examples of the method 700 and the apparatus described herein may further include operations, features, circuitry, logic, means, or instructions for opening a new data log for the memory array based on determining that the logical address may be unmapped and that the ending position of the logical address may be at or before the end of the first block, where the logical address may be associated with the new data log.

Some examples of the method 700 and the apparatus described herein may further include operations, features, circuitry, logic, means, or instructions for determining whether the level of usage satisfies a threshold, where a value of the threshold may be based on a quantity of available physical addresses of the memory array.

In some examples of the method 700 and the apparatus described herein, performing the write operation may include operations, features, circuitry, logic, means, or instructions for writing the data to a first portion of the memory array based on determining that the level of usage satisfies the threshold, where the first portion of the memory array includes the physical address and may be associated with a first reliability level higher than a second reliability level associated with a second portion of the memory array.

In some examples of the method 700 and the apparatus described herein, performing the write operation may include operations, features, circuitry, logic, means, or instructions for writing the data to a second portion of the memory array based on determining that the level of usage fails to satisfy the threshold, where the second portion of the memory array includes the physical address and may be associated with a second reliability level lower than a first reliability level associated with a first portion of the memory array.

Some examples of the method 700 and the apparatus described herein may further include operations, features, circuitry, logic, means, or instructions for determining an ending position of the logical address relative to an end of a first block of the memory array, the first block having a first size and determining whether the logical address may be a next sequential logical address of an open data log of the memory array based on determining that the ending position of the logical address may be after the end of the first block.

In some examples of the method 700 and the apparatus described herein, setting the value may include operations, features, circuitry, logic, means, or instructions for setting a value of zero for the first field based on determining that the logical address may be the next sequential logical address of the open data log and updating the open data log with the logical address and a size of the data based on determining the value of zero for the first field.

In some examples of the method 700 and the apparatus described herein, setting the value may include operations, features, circuitry, logic, means, or instructions for identifying that the first field may have a first value and incrementing the first value to a second value based on determining that the logical address may be different than the next sequential logical address of the open data log.

In some examples of the method 700 and the apparatus described herein, setting the value may include operations, features, circuitry, logic, means, or instructions for identifying that the first field may have a first value based on determining that the logical address may be different than the next sequential logical address of the open data log and maintaining the first value for the first field based on identifying that the first field may have the first value.

It should be noted that the methods described above describe possible implementations, and that the operations and the steps may be rearranged or otherwise modified and that other implementations are possible. Further, portions from two or more of the methods may be combined.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal; however, the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on the operation of the device that includes the connected components. The conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" refers to a condition of moving from an open-circuit relationship between components in which signals are not presently capable of being communicated between the components over a conductive path to a closed-circuit relationship between components in which signals are capable of being communicated between components over the conductive path. If a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other if the switch is open. If a controller isolates two components, the controller affects a change that prevents signals from flowing between the components using a conductive path that previously permitted signals to flow.

The terms "if," "when," "based on," or "based at least in part on" may be used interchangeably. In some examples, if the terms "if," "when," "based on," or "based at least in part on" are used to describe a conditional action, a conditional process, or connection between portions of a process, the terms may be interchangeable.

The term "in response to" may refer to one condition or action occurring at least partially, if not fully, as a result of a previous condition or action. For example, a first condition or action may be performed, and second condition or action may at least partially occur as a result of the previous condition or action occurring (whether directly after or after one or more other intermediate conditions or actions occurring after the first condition or action).

Additionally, the terms "directly in response to" or "in direct response to" may refer to one condition or action occurring as a direct result of a previous condition or action. In some examples, a first condition or action may be performed, and second condition or action may occur directly as a result of the previous condition or action occurring independent of whether other conditions or actions occur. In some examples, a first condition or action may be performed and second condition or action may occur directly as a result of the previous condition or action occurring, such that no other intermediate conditions or actions occur between the earlier condition or action and the second condition or action or a limited quantity of one or more intermediate steps or actions occur between the earlier condition or action and the second condition or action. Any condition or action described herein as being performed "based on," "based at least in part on," or "in response to" some other step, action, event, or condition may additionally or alternatively (e.g., in an alternative example) be performed "in direct response to" or "directly in response to" such other condition or action unless otherwise specified.

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In some other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component or a transistor discussed herein may represent a field-effect transistor (FET) and comprise a three terminal device including a source, drain, and gate. The terminals may be connected to other electronic elements through conductive materials, e.g., metals. The source and drain may be conductive and may comprise a heavily-doped, e.g., degenerate, semiconductor region. The source and drain may be separated by a lightly-doped semiconductor region or channel. If the channel is n-type (i.e., majority carriers are electrons), then the FET may be referred to as an n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" if a voltage greater than or equal to the transistor's threshold voltage is applied to the transistor gate. The transistor may be "off" or "deactivated" if a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration" and not "preferred" or "advantageous over other examples." The detailed description includes specific details to providing an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a hyphen and a second label that distinguishes among the similar components. If just the first reference label is used in the specification, the description is applicable to any one of the similar components having the same first reference label irrespective of the second reference label.

The functions described herein may be implemented in hardware, software executed by a processor, firmware, or any combination thereof. If implemented in software executed by a processor, the functions may be stored on or transmitted over, as one or more instructions or code, a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

For example, the various illustrative blocks and components described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may be implemented as a combination of computing devices (e.g., a combination of a DSP and a microprocessor, multiple microprocessors, one or more microprocessors in conjunction with a DSP core, or any other such configuration).

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk, and Blu-ray disc, where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus, comprising:
   a memory device; and
   a controller coupled with the memory device and configured to cause the apparatus to:
      receive, at the memory device, a write command indicating data to be written, a type of the data, and a first logical address of a memory array for writing the data;
      identify a first entry of a plurality of entries in a table, the table comprising a mapping between logical addresses and physical addresses of the memory array, wherein each of the plurality of entries is associated with a respective logical address and comprises:
         a pointer to a respective physical address associated with the respective logical address; and
         a first field indicating a respective level of usage of the respective logical address, wherein the first entry is associated with the first logical address;
      determine whether the type of the data is different than metadata or forced unit access (FUA) data;
      set, based at least in part on whether the type of the data is different than metadata or FUA data, a value for the first field of the first entry to indicate the respective level of usage of the first logical address; and
      write the data to a first physical address of the memory array after setting the value for the first field of the first entry, wherein the first physical address is based at least in part on the value for the first field of the first entry.

2. The apparatus of claim 1, wherein the controller configured to set the value is further configured to cause the apparatus to:
   set a first value for the first field based at least in part on the type of the data being a first type of data.

3. The apparatus of claim 2, wherein the first type of data comprises metadata or prioritized data.

4. The apparatus of claim 2, wherein the first field comprises a set of bits for indicating the level of usage, and wherein the first value comprises a value of one for each bit of the set of bits.

5. The apparatus of claim 1, wherein determining whether the type of the data is different than metadata or FUA data comprises determining that the type of the data is different than metadata or FUA data;
   wherein the controller is further configured to cause the apparatus to:
      determine whether the first logical address is unmapped after determining that the type of the data is different than metadata or FUA data.

6. The apparatus of claim 5, wherein to set the value for the first field of the first entry, the controller is configured to cause the apparatus to:
   set a value of zero for the first field of the first entry based at least in part on determining that the first logical address is unmapped.

7. The apparatus of claim 5, wherein to set the value for the first field of the first entry, the controller is configured to cause the apparatus to:
- identify that the first field of the first entry has a first value, based at least in part on determining that the first logical address is mapped; and
- increment the first value of the first entry to a second value.

8. The apparatus of claim 5, wherein to set the value for the first field of the first entry, the controller is configured to cause the apparatus to:
- identify that the first field of the first entry has a first value, based at least in part on determining that the first logical address is mapped; and
- maintain the first value for the first field of the first entry, based at least in part on identifying that the first field of the first entry has the first value.

9. The apparatus of claim 8, wherein the first field of the first entry comprises a set of bits for indicating the level of usage of the first logical address, and wherein the first value of the first entry comprises a value of one for each bit of the set of bits.

10. The apparatus of claim 5, wherein the controller is further configured to cause the apparatus to:
- determine an ending position of the first logical address relative to an end of a first block of the memory array, the first block having a first size, wherein determining whether the first logical address is unmapped is based at least in part on determining that the ending position of the first logical address is at or before the end of the first block.

11. The apparatus of claim 10, wherein the controller is further configured to cause the apparatus to:
- create and open a new data log for the memory array based at least in part on determining that the first logical address is unmapped and that the ending position of the first logical address is at or before the end of the first block, wherein the first logical address is associated with the new data log.

12. The apparatus of claim 1, wherein the controller is further configured to cause the apparatus to:
- determine whether the level of usage satisfies a threshold, wherein a value of the threshold is based at least in part on a quantity of available physical addresses of the memory array.

13. The apparatus of claim 12, wherein the controller configured to perform the write operation is further configured to cause the apparatus to:
- write the data to a first portion of the memory array based at least in part on determining that the level of usage satisfies the threshold, wherein the first portion of the memory array comprises the physical address and is associated with a first reliability level higher than a second reliability level associated with a second portion of the memory array.

14. The apparatus of claim 12, wherein the controller configured to perform the write operation is further configured to cause the apparatus to:
- write the data to a second portion of the memory array based at least in part on determining that the level of usage fails to satisfy the threshold, wherein the second portion of the memory array comprises the physical address and is associated with a second reliability level lower than a first reliability level associated with a first portion of the memory array.

15. The apparatus of claim 1, wherein the controller is further configured to cause the apparatus to:
- determine an ending position of the logical address relative to an end of a first block of the memory array, the first block having a first size; and
- determine whether the logical address is a next sequential logical address of an open data log of the memory array based at least in part on determining that the ending position of the logical address is after the end of the first block.

16. The apparatus of claim 15, wherein the controller configured to set the value is further configured to cause the apparatus to:
- set a value of zero for the first field based at least in part on determining that the logical address is the next sequential logical address of the open data log; and
- update the open data log with the logical address and a size of the data based at least in part on determining the value of zero for the first field.

17. The apparatus of claim 15, wherein the controller configured to set the value is further configured to cause the apparatus to:
- identify that the first field has a first value; and
- increment the first value to a second value based at least in part on determining that the logical address is different than the next sequential logical address of the open data log.

18. The apparatus of claim 15, wherein the controller configured to set the level of usage is further configured to cause the apparatus to:
- identify that the first field has a first value based at least in part on determining that the logical address is different than the next sequential logical address of the open data log; and
- maintain the first value for the first field based at least in part on identifying that the first field has the first value.

19. A non-transitory computer-readable medium storing code comprising instructions which, when executed by a processor of an electronic device, cause the electronic device to:
- receive, at the electronic device, a write command indicating data to be written, a type of the data, and a first logical address of a memory array for writing the data;
- identify a first entry of a plurality of entries in a table, the table comprising a mapping between logical addresses and physical addresses of the memory array, wherein each of the plurality of entries is associated with a respective logical address and comprises:
  - a pointer to a respective physical address associated with the respective logical address; and
  - a first field indicating a respective level of usage of the respective logical address, wherein the first entry is associated with the first logical address;
- determine whether the type of the data is different than metadata or forced unit access (FUA) data;
- set, based at least in part on whether the type of the data is different than metadata or FUA data, a value for the first field of the first entry to indicate the respective level of usage of the first logical address; and
- write the data to a first physical address of the memory array after setting the value for the first field of the first entry, wherein the first physical address is based at least in part on the value for the first field of the first entry.

20. The non-transitory computer-readable medium of claim 19, wherein the instructions to set the value, when executed by the processor of the electronic device, further cause the electronic device to:
- set a first value for the first field based at least in part on the type of the data being a first type of data.

21. The non-transitory computer-readable medium of claim 19, wherein to determine whether the type of the data is different than metadata or FUA data, the instructions, when executed by the processor of the electronic device, further cause the electronic device to:
- determine that the type of the data is different than metadata or FUA data;
- wherein the instructions, when executed by the processor of the electronic device, further cause the electronic device to:
  - determine whether the first logical address is unmapped after determining that the type of the data is different than metadata or FUA data.

22. The non-transitory computer-readable medium of claim 21, wherein to set the value for the first field of the first entry, the instructions, when executed by the processor of the electronic device, further cause the electronic device to:
- set a value of zero for the first field of the first entry, based at least in part on determining that the first logical address is unmapped.

23. The non-transitory computer-readable medium of claim 21, wherein to set the value for the first field of the first entry, the instructions, when executed by the processor of the electronic device, further cause the electronic device to:
- identify that the first field of the first entry has a first value, based at least in part on determining that the first logical address is mapped; and
- increment the first value of the first entry to a second value.

24. The non-transitory computer-readable medium of claim 21, wherein to set the value for the first field of the first entry, the instructions, when executed by the processor of the electronic device, further cause the electronic device to:
- identify that the first field of the first entry has a first value based at least in part on determining that the first logical address is mapped; and
- maintain the first value for the first field of the first entry based at least in part on identifying that the first field of the first entry has the first value.

25. A method performed by a memory device, the method comprising:
- receiving, at the memory device, a write command indicating data to be written, a type of the data, and a first logical address of a memory array for writing the data;
- identifying a first entry of a plurality of entries in a table, the table comprising a mapping between logical addresses and physical addresses of the memory array, wherein each of the plurality of entries is associated with a respective logical address and comprises:
  - a pointer to a respective physical address associated with the respective logical address; and
  - a first field indicating a respective level of usage of the respective logical address, wherein the first entry is associated with the first logical address;
- determining whether the type of the data is different than metadata or forced unit access (FUA) data;
- setting, based at least in part on whether the type of the data is different than metadata or FUA data, a value for the first field of the first entry to indicate the respective level of usage of the first logical address; and
- writing the data to a first physical address of the memory array after setting the value for the first field of the first entry, wherein the first physical address is based at least in part on the value for the first field of the first entry.

* * * * *